United States Patent [19]

Siddall et al.

[11] 3,711,547

[45] Jan. 16, 1973

[54] DIHALOCYCLOPROPYL SUBSTITUTED ALIPHATIC AMINES

[76] Inventors: John B. Siddall, 975 California Ave., Palo Alto, Calif.; Jean Pierre Calamie, Villa Laperla, 6605 Locarno, Switzerland

[22] Filed: April 27, 1970

[21] Appl. No.: 43,260

Related U.S. Application Data

[60] Division of Ser. No. 841,559, July 14, 1969, abandoned, which is a continuation-in-part of Ser. No. 800,267, Feb. 18, 1969, abandoned, which is a continuation-in-part of Ser. No. 618,321, Feb. 24, 1967, abandoned.

[52] U.S. Cl.........260/563 R, 260/247, 260/247.7 G, 260/268 R, 260/293.51, 260/293.67, 260/326.8, 260/340.9, 260/348 R, 260/488 H, 260/501.1, 260/561 D, 260/561 N, 260/573, 260/574, 260/576, 260/577, 260/593 H, 260/594, 260/614 R, 260/632 R, 260/638 R, 260/653.3, 424/248, 424/250, 424/267, 424/325

[51] Int. Cl.............................................C07c 87/24
[58] Field of Search..................................260/563 R

[56] References Cited

UNITED STATES PATENTS 3,541,154  11/1970  Schmialek et al....................260/583
3,669,997  6/1972  Calame et al.......................260/40 S

*Primary Examiner*—Lewis Gotts
*Assistant Examiner*—D. R. Phillips
*Attorney*—Donald W. Erickson

[57] ABSTRACT

3,7,11-Trialkyl aliphatic amines having a chain length of 12 to 17 carbons substituted at position C-2,3, C-6,7 and/or C-10,11 with a dihalocyclopropyl group which are useful for the control of insects.

9 Claims, No Drawings

DIHALOCYCLOPROPYL SUBSTITUTED ALIPHATIC AMINES

This is a division of application Ser. No. 841,559 filed July 14, 1969 which in turn is a continuation-in-part of application Ser. No. 800,267 filed February 18, 1969, which is a continuation-in-part of application Serial No. 618,321 filed February 24, 1967, each now abandoned.

The present invention relates to novel organic compounds and to processes for their preparation.

More specifically, the present invention pertains to certain compounds that inhibit maturation of arthropods and to processes for the preparation of such compounds.

The compounds of the present invention may be represented by the following structural formula (A):

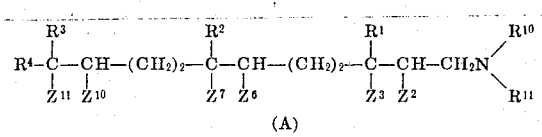

(A)

wherein, each of $R^1$, $R^2$, $R^3$ and $R^4$ is lower alkyl;

each of $R^{10}$ and $R^{11}$ is hydrogen, alkyl, hydroxyalkyl, alkoxyalkyl, phenyl, or, when taken together with the nitrogen atom to which they are attached, pyrrolidino, piperidino, morpholino, piperazino or 4'-(lower)alkylpiperazino group;

$Z^2$ is hydrogen;

$Z^3$ is hydrogen, thereof, bromo, chloro, fluoro, or, when taken together with $Z^2$, is a carbon-carbon double bond between C—2,3 or one of the groups

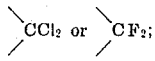

$Z^6$ is hydrogen, thereof, bromo, chloro or fluoro;

$Z^7$ is hydrogen, bromo, chloro, fluoro, or, when taken together with $Z^6$, is a carbon-carbon double bond between C—6,7 or one of the groups

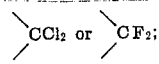

$Z^{10}$ is hydrogen, bromo, chloro or fluoro; and $Z^{11}$ is hydrogen, bromo, chloro, fluoro, or, when taken together with $Z^{10}$, is a carbon-carbon double bond between C—10,11 or one of the groups

provided that: at least one of $Z^3$ taken with $Z^2$, $Z^7$ taken with $Z^6$ or $Z^{11}$ taken with $Z^{10}$ is the group

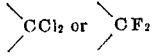

when $Z^3$ is hydrogen — then $Z^2$ is hydrogen.

Included within the scope of the present invention are the acid addition salts of the amines.

Included within the scope of the present compounds of formula A are primary amines (each of $R^{10}$ and $R^{11}$ is hydrogen), secondary amines ($R^{10}$ is hydrogen and $R^{11}$ is other than hydrogen) and tertiary amines ($R^{10}$ and $R^{11}$ are both other than hydrogen).

The chain length of the compounds of the present invention is from 12 carbon atoms (where each of $R^3$ and $R^4$ is methyl) to 17 carbon atoms (where at least one of $R^3$ or $R^4$ is n-hexyl). The C-3 and C-7 carbon atoms are substituted with lower alkyl groups ($R^1$ and $R^2$), and the C-11 carbon atom is substituted with two lower alkyl groups ($R^3$ and $R^4$). In addition, the C-2, C-3, C-6, C-7, C-10 and C-11 carbon atoms, independently, are optionally substituted ($Z^2$, $Z^3$, $Z^6$, $Z^7$, $Z^{10}$ and $Z^{11}$) with groups other than hydrogen.

Each of the pair of carbon atoms C-2,3, C-6,7 and C-10,11 can be linked by a single bond, a double bond or can contain a fused grouping, dichloromethylene and difluoromethylene.

Where two adjacent carbon atoms, such as the C-6 and C-7 or C-10 and C-11 carbon atoms, are substituted with halide atoms i.e. $Z^6$ and $Z^7$ or $Z^{10}$ and $Z^{11}$ being halo), the halide atoms are preferably the same.

The term "(lower)alkoxy" denotes a group comprising a straight chain aliphatic hydrocarbon of from one to six carbon atoms with an oxygen atom bonded to the C-1 carbon atom. Typical of such (lower)alkoxy are methoxy, ethoxy, 1-propoxy, 1-butoxy, and the like.

The term "alkyl" denotes a group comprising a straight or branch chain aliphatic saturated hydrocarbon having a chain length of from one to eight carbon atoms. Typical of such alkyl are methyl, ethyl, propyl, isopropyl, butyl, pentyl, hexyl, octyl, and the like. When qualified by the term "lower", such a group will have a chain length of no more than six carbon atoms. Typical of such lower alkyl are methyl, ethyl, propyl, isopropyl, butyl, isobutyl, pentyl, hexyl, and the like.

The term "hydroxyalkyl" denotes a group comprising a straight or branched chain aliphatic hydrocarbon of from one to six carbon atoms substituted with one or two hydroxy groups. Typical of such hydroxyalkyl are hydroxymethyl, β-hydroxyethyl, 6-hydroxyhexyl, and the like.

The term "alkoxyalkyl" denotes a group comprising a straight or branched chain aliphatic hydrocarbon of from one to eight carbon atoms substituted with one or two alkoxy groups of from one to eight carbon atoms. Typical of such "alkoxyalkyl" are methoxymethyl, 2-ethoxyethyl, 3-methoxypropyl, 3-ethoxypropyl, and the like.

The term "hydroxy and esters and ethers thereof", as used herein, refers to free hydroxyl and esters and ethers which are hydrolyzable to free hydroxyl. Typical esters are carboxylic esters of up to 12 carbon atoms which are saturated or unsaturated and of straight chain aliphatic, branched chain aliphatic, and cyclic or cyclic aliphatic structure, such as acetate, propionate, butyrate, valerate, caproate, enanthate, pelargonate, acrylate, undecanoate, phenoxyacetate, benzoate, phenylacetate, diethylacetate, trimethylacetate, trichloroacetate, t-butylacetate, trimethylhexanoate, methylneopentylacetate, cyclohexylacetate, cyclopentylpropionate, adamantoate, methoxyacetate, acetoxyacetate, aminoacetate, diethylaminoacetate, β-chloropropionate, 2-chloro-4-nitrobenzoate, piperidinoacetate, and the like, preferably a lower hydrocarbon carboxylic ester containing up to six carbon atoms. Typical ethers are formed by etherification of the hydroxy group by tetrahydrofuran-2-yl, tetrahydropyran-2-yl or by a monovalent hydrocarbon group of up to eight carbon atoms which can be of straight, branched, cyclic or cyclic aliphatic structure, such as alkyl, alkenyl, cycloalkyl, or aralkyl, e.g. methyl, ethyl, propyl, butyl, pentyl, butenyl, phenethyl, benzyl, cyclopentyl, cyclohexyl, and the like.

The presence of double bonds, epoxide groupings and methylene, difluoromethylene or dichloromethylene groupings gives rise to geometric isomerism in the configuration of these compounds.

This isomerism occurs with regard to the double bond, the epoxide grouping or the unsubstituted or di-substituted methylene grouping bridging the C-2,3 carbon atoms, the C-6,7 atoms and the C-10,11 atoms. Obviously, isomerism at the C-10,11 carbon atoms occurs only when $R^3$ and $R^4$ are different alkyl groups. The isomers are the cis and trans of the monoene series; the cis,cis; cis,trans; trans,cis; and trans,trans of the diene series; and the eight isomers of the triene series; each of which isomers in each series being included within the scope of this invention. Each of these isomers are separable from the reaction mixture by which they are prepared by virtue of their different physical properties via conventional techniques, such as chromatography, including thin-layer and gas-liquid chromatography, as described in more detail hereinafter.

The compounds of this invention are arthropod maturation inhibitors. They possess the ability to inhibit the maturation of members of the phylum Arthropoda, particularly insects, in the passage from one metamorphic stage to the next metamorphic stage. Thus, in the case of insects passing from the embryo stage to the larva stage, thence to the pupa stage and thence to the adult stage, contact with an effective amount of a compound of the present invention, at any of the first three stages, inhibits passage to the next developmental stage with the insect either repeating passage through its present stage or dying. Moreover, these compounds exhibit ovicidal properties with insects and accordingly are useful in combating insects. These compounds are very potent and thus can be used at extremely low levels, e.g. from $10^{-6}$ to $10^{-9}$ g. and are thus advantageously administered over large areas in quantities suitable for the estimated insect population. Generally, the substances are liquids and for the purposes herein described, they can be utilized in conjunction with liquid or solid carriers. Typical insects against which these compounds are effective include mealworm, housefly, bollweevil, cornborer, mosquito, cockroach, moth, and the like.

Although not intending to be limited by any theoretical explanation, it appears that the effectiveness of these derivatives can be traced to their ability to mimic the activity of certain so-called "juvenile hormone" substances, such as those described in U.S. Pat. No. 2,981,655 and Law et al., *Proc. Nat. Acad. Sci.* 55, 576 (1966). Because of the potency of the compounds of the present invention, they can be employed in extremely low concentrations, as noted above, to obtain reproducible predetermined level of activities. Juvenile hormone substances have been referred to as growth hormone also. Juvenile hormone was identified as methyl 10,11-oxide-7-ethyl-3,11-trimethyltrideca-2,6-dienoate using an extract of cecropia moths by Roeller et al., *Angew. Chem. internat. Edit.* 6, 179 (February 1967) and *Chemical & Engineering News*, 48–49 (April 10, 1967). A second juvenile hormone from the same source has been identified as methyl 10,11-oxido-3,7,11-trimethyltrideca-2,6-dienoate by Meyer et al., "The Two Juvenile Hormones from the Cecropia Silk Moth", *Zoology* (Proc. N.A.S.) 60, 853 (1968). In addition to the natural juvenile hormones and the unidentified mixture of Law et al. above, some synthetic terpenoids have been reported to exhibit juvenile hormone activity — Bowers et al., *Life Sciences* (Oxford) 4, 2323 (1965) — methyl 10,11-oxido-3,7,11-trimethyldodeca-2,6-dienoate; Williams et al., *Journal of Insect Physiology* 11, 569 (1965); *BioScience* 18, No. 8, 791 (August 1968); Williams, *Scientific American* 217, No. 1, 13 (July 1967); *Science* 154, 248 (Oct. 14, 1966); Romanuk et al., *Proc. Nat. Acad. Sci.* 57, 349 (February 1967) — 7,11-dichloro of esters of farnesoic acid — Canadian Pat. No. 795,805 (1968); Masner et al., *Nature* 219, 395 (July 27, 1968); and U.S. Pat. No. 3,429,970 — farnesene derivatives.

The compounds of the present invention may be prepared chemically according to a number of alternative routes. One such route is illustrated by the following sequence of reactions:

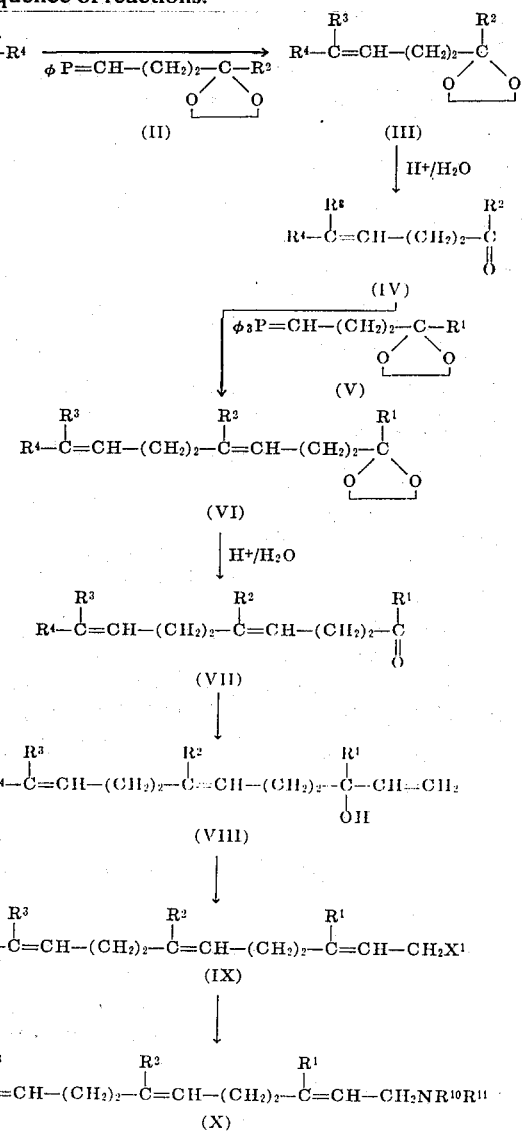

In the above scheme, each of $R^1$, $R^2$, $R^3$, $R^4$, $R^{10}$ and $R^{11}$ is as hereinbefore defined, the symbol "$\phi$" represents phenyl and $X^1$ is bromo or chloro.

With reference to the above reaction scheme (I → X), the selected dialkylketone (I) is reacted with equal molar quantities and, preferably, an excess of the 4-ethylene ketal of the 4-alkylbutylidenetriphenylphosphorane Wittig reagent derivatives (II) in an organic reaction medium, such as is preferably provided by an aprotic solvent with a high dielectric constant, e.g. dimethylsulfoxide, dimethylformamide, and the like, at reflux temperature to afford the corresponding substituted ethylenedioxyalkene Wittig reaction adduct (III). This process thus makes possible the union of hydrocarbon chains with concomitant formation of double bond unsaturation at the juncture.

In the above described process, the 4-ethylene ketal of the 4-alkylbutylidenetriphenylphosphorane Wittig reagent is prepared by conventional procedures, such as is disclosed by Trippett, *Advances in Organic Chemistry*, Vol. I, pp. 83–102; Trippett, *Quarterly Review*, Vol. 16–17, pp. 406–410; and Greenwald et al., *Journal of Organic Chemistry* 28, 1128 (1963) from the 4-ethylene ketal of a 4-alkylbutyl halide (1-halo-4-alkanone) upon treatment thereof with triphenylphosphine and subjecting the resultant phosphonium halide to the action of butyl or phenyl lithium.

The 4-ethylene ketal of the 1-halo-4-alkanone is obtained by subjecting the 4-keto compound to a conventional ketalysis with ethylene glycol in benzene in the presence of an aryl sulfonic acid, such as p-toluenesulfonic acid. The latter 1-halo-4-alkanones, particularly the 1-bromo derivatives, are prepared by known processes, such as that described in German Pat. No. 801,276 (Dec. 28, 1950) and by Jager et al., Arch. Pharm. 293, 896 (1960). Briefly, the procedure is to treat butyrolactone with the desired alkyl alkanoate to obtain the corresponding α-arylbutyrolactone adduct. Treatment of the latter adduct with an alkali metal halide, particularly sodium bromide, in aqueous sulfuric acid then provides the corresponding 1-bromo-4-alkanone. For example, butyrolactone when treated with ethylacetate gives α-acetylbutyrolactone which upon treatment with sodium bromide in aqueous sulfuric acid gives 1-bromo-4-pentanone.

Hydrolysis of the Wittig reaction adduct (III) with aqueous acid affords the free ketone (IV).

By repeating the Wittig reaction just described on the thus-formed ketone (IV), with the Wittig reagent (V) being prepared as already described, the corresponding ethylene ketal diene adduct (VI) is obtained, which is, in turn, hydrolyzed with aqueous acid to the tetraalkyl substituted nonadienone (VII).

Conversion of the thus-prepared compound (VII) to the 3,7,11-tetra(lower)alkyl-3-hydroxyundeca-1,6,10-triene (VIII) follows upon treatment with vinyl magnesium bromide in an inert, non-aqueous organic solvent, preferably diethyl ether.

The 1-halides represented by formula IX are prepared by treating the corresponding compounds of formula VIII with a phosphorus trihalide, such as phosphorus trichloride or phosphorus tribromide, in a basic solvent, such as pyridine or triethylamine.

The amines represented by formula X are prepared by treating the corresponding 1-chloro or 1-bromo compounds of formula IX, where $X^1$ = chloro or bromo, with ammonia to obtain the primary amines of formula X, where $R^{10}$ and $R^{11}$ are each hydrogen; with a mono-substituted amine to obtain the secondary amines of formula X, where $R^{10}$ is hydrogen and $R^{11}$ is other than hydrogen; and with a di-substituted amine to obtain the tertiary amines of formula X, where $R^{10}$ and $R^{11}$ are other than hydrogen.

Alternatively, the amines are prepared from the corresponding amides by the route illustrated by the following reaction sequence:

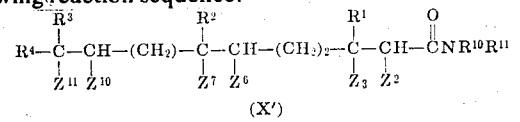

(X')

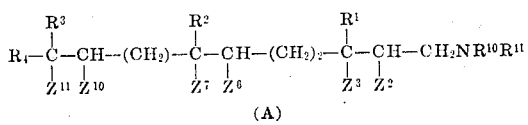

(A)

The amine compounds of formula A are prepared by reducing the corresponding amide of formula X' with a reducing agent, such as lithium aluminum hydride, and the like. This method is especially preferred for the preparation of the 2,3-methylene-amine compounds (compounds of formula A, where $Z^2$ and $Z^3$ taken together are the group

The amide starting compounds of formula X', where $R^1$, $R^2$, $R^3$, $R^4$, $R^{10}$, $R^{11}$, $Z^2$, $Z^3$, $Z^6$, $Z^7$, $Z^{10}$ and $Z^{11}$ are as defined hereinbefore, are prepared according to the procedures described in our U.S. Patent Application Ser. No. 618,339, filed Feb. 24, 1967, now abandoned.

After the compounds of formula VIII, IX and X have been prepared, further optional elaboration of the molecule (represented in Formula A by the Groups $Z^2$, $Z^3$, $Z^6$, $Z^7$, $Z^{10}$ and $Z^{11}$) via certain preferred sequences, is conducted as follows.

Addition of the oxido group at the C-2,3, C-6,7 and C-10,11 positions is performed with m-chlorobenzoic acid, preferably in methylene chloride or chloroform as a solvent.

The fused difluoromethylene group at positions C-2,3, C-6,7 and C-10,11 is added by reacting the starting monoene, diene or triene compound with trimethyltrifluoromethyl tin reagent in the presence of sodium iodide in benzene/mono or diglyme solvent at reflux over a period of a few hours. By varying the mole ratio of the two reactants, and the temperature and time of reaction, the reaction can be favored toward one or the other mono adducts, bis adducts or the tris adduct.

The fused dichloromethylene group is introduced by reacting the starting monoene, diene or triene (at C-2,3 and/or C-6,7 and/or C-10,11) with phenyl-dichlorobromomethyl mercury reagent in benzene at reflux for 1 to 5 hours. Again, the relative yield of one or the other mono adducts, bis adducts or the tris adduct varies with the amount of mercury reagent and the reaction conditions. Generally, about or slightly more than 1 molar equivalent provides the mono adducts, the bis adducts being favored by use of two or three molar equivalents, the tris adduct being favored by five or more molar equivalents.

Hydrogenation of one or more of the double bonds to the corresponding saturated (carbon-carbon single bond) linkage ($Z^2=Z^3=H$, $Z^6=Z^7=H$, $Z^{10}=Z^{11}=H$) is conveniently preformed in benzene over a 5% palladium catalyst on carbon or barium sulfate support, halogen groups being later restored as described below, if necessary.

The hydroxy, (lower)alkoxy and halo groups at one or more positions on the backbone chain as indicated by the above definitions relating to formulas A and B are introduced via a number of methods.

At the C-2,3 position, the monohydroxy substituent at C-3 ($Z^2$=hydrogen, $Z^3$=hydroxy) is introduced by first selectively forming the 2,3-oxido derivative as described above and thereafter opening the ring by treatment with a mole or less of lithium aluminum hydride under mild conditions, such as at temperatures of from 0°C to about 30°C.

Etherification is thereafter conducted by methods known per se. For example, the hydroxy group can be treated with sodium hydride followed by an alkyl halide, such as ethyl bromide, to form the desired (lower)alkoxy group. 2-Halotetrahydropyran and 2-halotetrahydrofuran are utilized for the corresponding tetrahydrofuran-2'-yl and tetrahydropyran-2'-yl ethers. Acylation is likewise accomplished by known chemical processes, such as through the use of an acid anhydride in the presence of an acid catalyst, for example, p-toluenesulfonic acid.

The bis 2,3-dihydroxy compounds are prepared by treating the 2,3-oxido derivative with 0.01 N to 0.001 N perchloric acid in aqueous solution at room temperature for about 16 hours. The 2-hydroxy-3-(lower)alkoxy compounds are formed by similar catalytic treatment of the epoxide with perchloric acid in the presence of an alkanol. The 2-hydroxy-3-halo compounds are prepared by treating the 2,3-epoxide with hydrogen halide, the 3-halo being the halogen of the acid used.

Each of the C-6,7 and C-10,11 positions are similarly elaborated. The mono-substituted derivatives ($Z^6=Z^{10}$=hydrogen) are prepared by treating the monoene or diene with aqueous formic acid or aqueous sulfuric acid to afford the hydroxy compounds ($Z^7$ and/or $Z^{11}$ = hydroxy). Etherification and esterification thereof is performed as described above. The halo compounds ($Z^3$ and/or $Z^7$ and/or $Z^{11}$ = halo) are prepared by similarly treating the unsaturated linkage with hydrogen halide, the halo substituent being the one of the acid employed.

By halogenating with a hydrogen halide in carbon tetrachloride at about 0°C, the halogenation of the C-10, C-11 carbon-carbon double bond is favored yielding substantially the 11-halo adduct. By using other solvents, such as diethyl ether, chloroform, benzene, and the like, the C-2,C-3; C-6,C-7; and C-10,C-11 carbon-carbon double bonds will all be halogenated to some extent depending upon the amount of reagent present, and the reaction conditions; thus 3-halo, 7-halo, 11-halo, 3,7-dihalo, 3,11-dihalo, 7,11-dihalo and 3,7,11-trihalo adducts are obtained.

The hydroxy derivatives ($Z^6=Z^7$=hydroxy and/or $Z^{10}=Z^{11}$=hydroxy) are prepared from the precursor epoxide (introduced as described above) under anhydrous conditions with acid as set forth above. The procedure for preparing the 2-hydroxy-3-alkoxy or halo compounds is also used to prepare the 6(10)-hydroxy-7(11)-alkoxy and 6(10)-hydroxy-7(11)-halo compounds from the corresponding 6,7(10,11)-oxido compounds.

In the preparation of the 2(6)(10)-bromo or chloro 3(7)(A)-hydroxy compounds, the starting unsaturated compound is treated with the appropriate quantity of N-bromo or chlorosuccinimide in an aqueous organic solvent, such as dioxane. The corresponding 3(7)(11)-alkoxy compounds are similarly prepared by the presence of alkanol solvent.

The 2(6)(10)-fluoro-3(7)(11)-hydroxy compounds are prepared by treating the corresponding 2,3(6,7)(10,11)-oxido compounds with hydrogen fluoride in carbon tetrachloride at 0°C and isolating the product by conventional techniques, such as gas-liquid chromatography. The 2(6)(10)-fluoro-3(7)(11)-(lower)alkoxy compounds are obtained from the corresponding 2,3(6,7)()-oxido compounds, by treating the latter with hydrogen fluoride in the corresponding (lower)alkanol. Alternatively, the 2(6)(10)-fluoro-3(7)(A)-(lower)alkoxy compounds are prepared by treating the corresponding 2(6)(10)-fluoro-3(7)(11)-hydroxy compound with the corresponding diazo(lower)alkane in boron trifluoride at 0°C.

Acylation of the hydroxy compounds is accomplished through techniques known and used in the art. For example, the use of an acid anhydride in the presence of an acid catalyst, such as p-toluenesulfonic acid or with an acid chloride in the presence of a base, like pyridine or triethylamine.

The halo compounds ($Z^2=Z^3$=halo and/or $Z^6=Z^7$=halo and/or $Z^{10}=Z^{11}$=halo) are formed by treating the olefin with bromine, chlorine or fluorine, in a chlorinated hydrocarbon solvent, such as chloroform or methylene chloride.

In the practice of the above-described elaborations on the compounds hereof, relative sensitivities of various groups to certain reaction conditions dictates the preference for a general pattern of reaction sequences. Thus, in accordance herewith, the halo groups are usually introduced after the difluoromethylene and dichloromethylene groups have been introduced.

The remaining sites of unsaturation are generally epoxidized as the next step. This is true for compounds which possess a substituent that is introduced under acidic conditions, i.e. a hydroxy group, introduced by the formic acid/sodium formate process. Moreover, since the acidic conditions required for the addition of hydrogen halides cleave the epoxide, it is preferred to insert the oxide after such reactions are performed unless, of course, the epoxide is required for the insertion of the hydroxy(alkoxy)halo bis-substituents.

With the exception of the above proviso for the oxido group, the fused halomethylene groups are preferably introduced after the fused oxido groups are present since these reactions are compatible with these groups.

After all desired elaboration is complete, hydrogenation of any of the unsubstituted double bonds is, if desired, carried out. However, the introduction of a tertiary halo group is preferably introduced after the hydrogenation.

Separation of the various geometric isomers can be performed at any appropriate or convenient point in the overall process. An advantageous and particular synthetically valuable point at which to separate isomers by chromatography, and the like, is at the conclusion of each step of the backbone synthesis, that is, after preparing each of the compounds represented by formulas III, VI, VIII, IX and X.

The acid addition salts of the novel amines of the present invention are prepared from the amines using known procedures. For example, the amine and the acid can be dissolved in an inert solvent in which the acid addition salt is insoluble. The acid addition salt can then be isolated by filtration, or the like. Typical acid addition salts are the hydrochloride, citrate, tartrate, acetate, sulfate, pamoate, and the like.

The following examples will serve to further typify the nature of this invention. As these are presented solely for the purpose of illustration, they should not be construed as a limitation on the scope of this invention.

In some instances, for convenience, the various isomeric forms are specified; however, the carbon-carbon double bonds, epoxide, methylene, difluoromethylene or dichloromethylene groupings can be cis or trans geometric isomers independent of each other and in fact isomeric mixtures are frequently employed in the described reactions.

EXAMPLE 1

Twenty-five grams of trans 6,10-dimethylundeca-5,9-dien-2-one are added to a mixture of 300 ml. of 98 percent formic acid, 200 ml. of water, 1.5 g. of sodium formate and 0.5 g. of cetylpyridinium chloride. This mixture is then stirred vigorously at 30°C for 4 days and then partitioned between water and ethyl acetate. The ethyl acetate solution is washed with water, dried over sodium sulfate and evaporated under vacuum to yield trans 6,10-dimethyl-10-hydroxyundec-5-en-2-one.

By substituting the corresponding cis isomers, there is respectively obtained cis 6,10-dimethyl-10-hydroxyundec-5-en-2-one.

EXAMPLE 2

Two grams of cis 10-hydroxy-6,10-dimethylundec-5-en-2-one are added to a solution of diazoethane (2.8 g.) in ether (100 ml.) at 0°C. One drop of boron trifluoride etherate is added with stirring and the mixture is allowed to stand for 6 hours at 0°C. Evaporation of the water washed ethereal solution affords cis 10-ethoxy-6,10-dimethylundec-5-en-2-one.

Through the use of other diazo-n-(lower)alkanes, the corresponding ethers are obtained, e.g. cis 10-methoxy-6,10-dimethylundec-5-en-2-one and cis 10-propoxy-6,10-dimethylundec-5-en-2-one, through the use of diazomethane and diazopropane.

Use of diazotoluene or β-phenyldiazoethane in the foregoing procedure yields cis 10-benzyloxy-6,10-dimethylundec-5-en-2-one and cis 10-phenylethoxy-6,10-dimethylundec-5-en-2-one.

EXAMPLE 3

One gram of trans 6,10-dimethyl-10-hydroxyundec-5-en-2-one in 8 ml. of pyridine and 2 ml. of triethylamine is treated with 1 ml. of acetyl chloride. This mixture is allowed to stand for 15 hours at about 25°C and is then poured into ice water and extracted with methylene chloride. These extracts are washed well with water, dried over sodium sulfate and evaporated to yield trans 6,10-dimethyl-10-acetoxyundec-5-en-2-one.

Use of other acid chlorides, such as trimethylacetyl chloride, benzoyl chloride, phenylacetyl chloride, and the like, yields the corresponding esters.

EXAMPLE 4

Dry hydrogen chloride is bubbled through 100 ml. of ethyl ether at 0°C for about 15 minutes. One gram of trans 6,10-dimethylundeca-5,9-dien-2-one is added and the resulting solution is allowed to stand at 0°C for 5 hours. The solution is then washed with water, dried over sodium sulfate and evaporated to yield an oil. Upon purification by thin layer chromatography, there is obtained trans 6,10-dimethyl-10-chloroundec-5-en-2-one.

By substituting hydrogen bromide or hydrogen fluoride for hydrogen chloride in the foregoing procedure, there is obtained trans 6,10-dimethyl-10-bromoundec-5-en-2-one, or trans 6,10-dimethyl-10-fluoroundec-5-en-2-one.

By substituting the corresponding cis isomeric starting materials in each of these variations, there are respectively obtained: cis 6,10-dimethyl-10-chloroundec-5-en-2-one; cis 6,10-dimethyl-10-bromoundec-5-en-2-one; cis 6,10-dimethyl-10-fluoro-undec-5-en-2-one.

EXAMPLE 5

To a solution of 26.8 g. of trans 6,10-dimethyl-10-butoxyundec-5-en-2-one and 250 ml. of dry ethyl acetate, 500 ml. of (4 percent) reduced palladium-on-barium sulfate are added. The resulting mixture is hydrogenated at room temperature until 0.10 moles of gaseous hydrogen have been taken up. The mixture is filtered over a bed of diatomaceous earth, and the filtrate is added to 500 ml. of benzene, washed with four 150 ml. portions of water, dried over sodium sulfate and evaporated to dryness under reduced pressure to predominately yield the desired 6,10-dimethyl-10-butoxyundecan-2-one which is purified by preparative scale gas-liquid chromatography.

Similarly, 6,10-dimethyl-10-chloroundecan-2-one is prepared from trans 6,10-dimethyl-10-chloroundec-5-en-2-one.

EXAMPLE 6

A. To a solution of 20.9 g. of the ethylene ketal of 1-bromo-4-pentanone (obtained by treating 1-bromo-4-pentanone with ethylene glycol in benzene in the presence of p-toluenesulfonic acid) in 100 ml. of benzene is added 20 g. of triphenylphosphine. This mixture is heated at reflux temperature for 2 hours and then filtered. The solid material thus-collected is washed with benzene, dried in vacuo and added to 6.49 g. of butyl lithium in 50 ml. of dimethylsulfoxide. This mixture is stirred until an orange solution is obtained and 3.8 g. of methyl ethyl ketone is then added. This mixture is stirred at about 25°C for about 8 hours, poured into water and this mixture is extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate, they are evaporated to yield a mixture of the cis and trans isomers of 6-methyl-5-octen-2-one which is separated by preparative gas-liquid chromatography into the individual isomers.

B. To a solution of 20.9 g. of the ethylene ketal of 1-bromo-4-pentanone in 100 ml. of benzene is added 20 g. of triphenylphosphine. This mixture is heated at reflux temperature for 2 hours and then filtered. The solid material thus collected is washed with benzene, dried in vacuo and added to 6.49 g. of butyl lithium in 50 ml. of dimethylsulfoxide. This mixture is stirred until an orange solution is obtained and 5.5 g. of trans 6-methyl-5-octen-2-one (the ketone obtained in Part A) is then added. This mixture is stirred at about 25°C for about 8 hours, poured into water, and this mixture is extracted with ether. The ethereal extracts are concentrated and the residue thus obtained is added to a 0.1 N solution of hydrochloric acid in aqueous acetone and stirred for about 15 hours. The mixture is then poured into ice water and extracted with ethyl acetate. After washing these extracts with water and drying them over sodium sulfate, they are evaporated to furnish a mixture of the trans,trans and cis,trans isomers of 6,10-dimethyldodeca-5,9-dien-2-one which is separated by preparative gas-liquid chromatography to the individual isomers.

By repeating the above procedure with the exception of using cis 6-methyl-5-octen-2-one in place of trans 6-methyl-5-octen-2-one, there is obtained a mixture of the cis,cis and trans,cis isomers of 6,10-dimethyl-dodeca-5,9-diene-2-one which is separated as described above.

Similarly, in the above procedure, instead of using either the trans or cis isomers of 6-methyl-5-octen-2-one as the starting material, there can be used a mixture of the isomers obtained in Part A in which case a mixture of the four isomers is obtained which can then be separated by preparative gas-liquid chromatography into the four isomers.

C. Ten grams of 6,10-dimethyldodeca-5,9-dien-2-one are added to a mixture of 500 ml. of 98 percent formic acid, 300 ml. of water and 3 g. of sodium formate. The mixture is stirred vigorously for several days; the reaction mixture is then added to a liter of water and extracted with four 250 ml. portions of ethyl acetate. The ethyl acetate extracts are combined, washed with water to neutrality, dried over sodium sulfate and evaporated under vacuum to yield a mixture of 6,10-dimethyl-6-hydroxydodec-9-en-3-one, 6,10-dimethyl-10-hydroxydodec-5-en-2-one and 6,10-dimethyl-6,10-dihydroxydodecan-2-one. The compounds are separated by preparative scale gas-liquid chromatography.

D. Eleven grams of the mixed product, prepared in Part C, is added to diethyl ether. Diazoethane (6 g.) is added to the mixture followed by one drop of boron trifluoride etherate. The mixture is allowed to stand for 2 hours, washed with water and evaporated to yield a mixture of 6,10-dimethyl-6-ethoxydodec-9-en-3-one, 6,10-dimethyl-10-ethoxydodec-5-en-2-one and 6,10-dimethyl-6,10-diethoxydodecan-2-one.

Through the use of other diazo-1-n(lower)alkanes, the corresponding ethers are obtained, e.g. 6,10-dimethyl-6-methoxydodec-9-en-2-one, 6,10-dimethyl-10-methoxydodec-5-en-2-one and 6,10-dimethyl-6,10-dimethoxydodecan-2-one are prepared through the use of diazomethane.

Similarly, the other hydroxy products of Part C of the present process are etherified.

E. Diethyl ether (100 ml.) is saturated with dry hydrogen chloride at 0°C. One gram of a 6,10-dimethyldodeca-5,9-dien-2-one is added and the resulting mixture is allowed to stand at 0°C for six hours. The mixture is washed with water to neutrality, dried over sodium sulfate and evaporated to dryness to yield a mixture of 6,10-dimethyl-6-chlorododec-9-en-2-one, 6,10-dimethyl-10-chlorododec-5-en-2-one and 6,10-dimethyl-6,10-dichlorododecan-2-one.

By substituting hydrogen bromide or hydrogen fluoride for hydrogen chloride in the foregoing process, there is respectively obtained 6,10-dimethyl-6-bromododec-9-en-2-one, 6,10-dimethyl-10-bromododec-5-en-2-one, 6,10-dimethyl-6,10-dibromododecan-2-one, 6,10-dimethyl-6-fluorododec-9-en-2-one, 6,10-dimethyl-10-fluorododec-5-en-2-one and 6,10-dimethyl-6,10-difluorododecan-2-one.

The monoene and diene products of the processes of Parts B, C and D of the present example are used as starting materials for the present process. Likewise, the monoene products of the present process are used as starting materials for the process of Part C.

F. A mixture of 8.6 g. of m-chloroperbenzoic acid and 40 ml. of methylene chloride is slowly added to a mixture of 9 g. of 6,10-dimethyldodeca-5,9-dien-2-one and 50 ml. of methylene chloride. The addition is performed at −20°C. At the completion of the addition, the reaction mixture is allowed to stand for 4 hours. The mixture is washed with 5 percent aqueous sodium bicarbonate, then with water to neutrality, dried over sodium sulfate, and reduced to dryness to yield a mixture of 6,10-dimethyl-5,6-oxidododec-9-en-2-one and 6,10-dimethyl-9,10-oxidododec-5-en-2-one. The two compounds are separated by gas-liquid chromatography.

Similarly, by utilizing 17.2 g. of m-chloroperbenzoic acid in the above process 6,10-dimethyl-5,6;9,10-dioxidododecan-2-one is obtained.

By the method of the above process, 6,10-dimethyl-6-hydroxy-9,10-oxidododecan-2-one, 6,10-dimethyl-10-ethoxy-5,6-oxidododecan-2-one, 6,10-dimethyl-6-chloro-9,10-oxidododecan-2-one and 6,10-dimethyl-5,6-oxido-10-fluorododecan-2-one are prepared by utilizing 2,6-dimethyl-6-hydroxydodec-9-en-2-one, 6,10-dimethyl-10-ethoxydodeca-5-en-2-one, 6,10-dimethyl-6-chlorododeca-9-en-2-one and 6,10-dimethyl-10-fluorododec-5-en-2-one in place of 6,10-dimethyldodeca-5,9-dien-2-one.

The monoene and diene products of the processes of Parts B through E are used as starting materials for the present process of Part F.

G. To a solution of 21.0 g. of 6,10-dimethyldodec-5,9-dien-2-one and 250 ml. of dry ethyl acetate, 500 ml. of (4 percent) reduced palladium-on-barium sulfate are added. The resulting mixture is hydrogenated at room temperature until 0.10 moles of gaseous hydrogen have been taken up. The mixture is filtered over a bed of diatomaceous earth and the filtrate is added to 500 ml. of benzene, washed with 4 150 ml. portions of water, dried over sodium sulfate and evaporated to dryness under reduced pressure to predominately yield the desired 6,10-dimethyldodec-5-en-2-one which is purified by preparative scale gas-liquid chromatography.

Similarly, 6,10-dimethyl-10-chlorododecan-2-one, 6,10-dimethyl-6-fluorododecan-2-one, 6,10-dimethyl-9,10-oxidododecan-2-one, 6,10-dimethyl-6-hydroxydodecan-2-one and 6;10-dimethyl-6-ethoxydodecan-2-one are prepared from 6,10-dimethyl-10-chlorododec-5-en-2-one, 6,10-dimethyl-6-fluorododec-9-en-2-one, 6,10-dimethyl-9,10-oxidododec-5-en-2-one, 6,10-dimethyl-6-hydroxydodec-9-en-2-one and 6,10-dimethyl-6-ethoxydodec-9-en-2-one.

The monoene or diene products of the processes of Parts B through F are used as starting materials for the present process. Likewise, the monoene products of the present process are used as starting materials in the processes of Parts C through F of the present example.

H. Ten grams of 6,10-dimethyl-9,10-oxidododec-5-en-2-one is added to a mixture of 100 ml of a 0.01 N aqueous solution of perchloric acid and 100 ml. of dioxane. The mixture is allowed to stand for 10 hours. The addition and the reaction are performed at 30°C. Benzene (100 ml.) is added and the reaction mixture is washed with water to neutrality, dired over sodium sulfate and reduced to dryness under vacuum to yield 6,10-dimethyl-9,10-dihydroxydodec-5-en-2-one.

In a like manner, 6,10-dimethyl-6,9,10-trihydroxydodecan-2-one, 6,10-dimethyl-5,6-dihydroxy-10-ethoxydodecan-2-one, 6,10-dimethyl-6-chloro-9,10-dihydroxydodecan-2-one, 6,10-dimethyl-5,6-dihydroxy-10-fluorododecan-2-one, 6,10-dimethyl-5,6,9,10-tetrahydrododecan-2-one and 6,10-dimethyl-5,6-dihydroxydodec-9-en-2-one are respectively prepared from the corresponding oxido compounds prepared by the process of Part F; 6,10-dimethyl-6-hydroxy-9,10-oxidododecan-2-one, 6,10-dimethyl-5,6-oxido-10-hydroxydodecan-2-one, 6,10-dimethyl-6-fluoro-9,10-oxidododecan-2-one, 6,10-dimethyl-5,6-oxido-10-chlorododecan-2-one, 6,10-dimethyl-5,6,9,10-bisoxidododecan2-one and 6,10-dimethyl-5,6-oxidododeca-9-en-2-one.

By utilizing 100 ml. of ethanol in addition to the perchloric acid and dioxane in the above process, 6,10-dimethyl-9-hydroxy-10-ethoxydodec-5-en-2-one is obtained.

Treatment of the foregoing epoxide with hydrogen chloride gas in anhydrous dioxane at 15°C for 6 hours, yields 6,10-dimethyl-9-hydroxy-10-chlorododec-5-en-2-one.

All the oxido products of the process of Part F and G of the present example can be utilized as starting materials for the processes of the present part.

I. A mixture of 10 g. of 6,10-dimethyldodeca-5,9-dien-2-one and 100 ml. of carbontetrachloride is cooled to 0°C and saturated with chlorine. The mixture is allowed to stand for 1 hour, then it is reduced to dryness under vacuum to yield a mixture of 6,10-dimethyl-5,6-dichlorododec-9-en-2-one, 6,10-dimethyl-9,10-dichlorododec-5-en-2-one and 6,10-dimethyl-5,6,9,10-tetrachlorododecan-2-one. The compounds are separated by gas-liquid chromatography.

Similarly, by utilizing bromine in the above process, the following compounds are obtained: 6,10-dimethyl-5,6-dibromododec-9-en-2-one, 6,10-dimethyl-9,10-dibromododec-5-en-2-one and 6,10-dimethyl-5,6,9,10-tetrabromododecan-2-one. Ten grams of the above-mixed bromo compounds are added to a mixture of silver fluoride (30 g.) and acetone (150 ml.). The mixture is refluxed for 2 hours, cooled to room temperature and filtered. Benzene (100 ml.) is added to the mixture; the mixture is then washed with water, dried over sodium sulfate and evaporated to dryness under reduced pressure to yield a mixture of 6,10-dimethyl-5,6-difluorododec-9-en-2-one, 6,10-dimethyl-9,10-difluorododec-5-en-2-one and 6,10-dimethyl-5,6,9,10-tetrafluorododecan-2-one.

Alternatively, the latter three compounds are prepared by adding 6,10-dimethyldodec-5,9-dien-2-one (21 g.) to 200 ml. of fluorotrichloromethane cooled to −78°C and saturated with fluorine. After the mixture has stood for several hours, it is evaporated slowly to yield a mixture of the three fluoro compounds.

The monoene products of the foregoing process are utilized as starting materials in the processes of Parts C, D, E, F, G and H of the present example. Similarly, the monoene and diene products of the processes of Parts B through H are used as starting materials in the present process.

J. 6,10-Dimethyldodeca-5,9-dien-2-one (21 g., 0.1 moles) is added to a mixture of (trifluoromethyl)trimethyl tin reagent (35.0 g., 0.15 moles), benzene (50 ml.) and monoglyme (10 ml.). The mixture is stirred well, then a mixture of sodium iodide (22.5 g., 0.15 moles) and monoglyme (100 ml.) is added. The resulting mixture is refluxed for 4 hours, cooled to room temperature, diluted with benzene (100 ml.) and washed with water to neutrality, dried over sodium sulfate and evaporated slowly under vacuum to yield a mixture of 6,10-dimethyl-5,6-(difluoromethylene)dodec-9-en-2-one and 6,10-dimethyl-9,10-(difluoromethylene) dodec-5-en-2-one, which are separated by gas-liquid chromatography.

By utilizing (70.0 g., 0.3 moles) of (trifluoromethyl) trimethyl tin reagent in the above process, 6,10-dimethyl-5,6,9,10-bis(difluoromethylene)dodecan-2-one is obtained.

The monoene and diene products of the processes of Parts B, C, D, F, G and H of the present example are used as starting materials for the present process. Likewise, the monoene products of the present process are used as starting materials for the processes of Parts C through I of the present example.

K. 6,10-Dimethyldodeca-5,9-dien-2-one (21 g., 0.1 moles) is added to a mixture of (bromo dichloromethyl) phenyl mercury reagent (66.0 g., 0.15 moles), benzene (10 ml.) and diglyme (α,β-dimethoxyethane, 300 ml.). The mixture is stirred well, then sodium iodide (45.0 g., 0.15 moles), benzene (10 ml.) and diglyme (100 ml.) are added. The resulting reaction mixture is refluxed for 3 hours, cooled to room temperature, chromatographed on a silicic acid column, washed with water, dried over sodium sulfate and evaporated to dryness under vacuum to yield a mixture of 6,10-dimethyl-5,6-(dichloromethylene)-dodec-9-en-2-one and 6,10-dimethyl-9,10-

(dichloromethylene)dodec-5-en-2-one. The two compounds are separated by gas-liquid chromatography. By utilizing 0.3 moles of the mercury reagent in the above processes, 6,10-dimethyl-5,6;9,10-bis(dichloromethylene)dodecan-2-one is obtained.

The monoene and diene products of the processes of Parts B, C, D, F, G, H and J of the present example are used as starting materials for the present process. Likewise, the monoene products of the present process are used as starting materials for the processes of Parts C through J of the present example.

L. Twenty-one grams of 6,10-dimethyldodeca-5,9-dien-2-one is dissolved in 250 ml. of dioxane and 150 ml. of water. The solution is cooled to 10°C and treated with 17.8 g. of N-bromosuccinimide, added in portions with stirring. The mixture is stirred at about 25°C for 15 hours and then diluted with water, treated with sodium bisulfite, and extracted with ether. These etheral extracts are washed with water, dried over sodium sulfate and evaporated to yield a mixture of 6,10-dimethyl-5-bromo-6-hydroxydodec-9-en-2-one, 6,10-dimethyl-9-bromo-10-hydroxydodec-5-en-2-one and 6,10-dimethyl-5,9-dibromo-6,10-dihydroxydodecan-2-one. The compounds are separated by gas-liquid chromatography.

6,10-Dimethyl-5-chloro-6-hydroxydodec-9-en-2-one, 6,10-dimethyl-9-chloro-10-hydroxydodec-5-en-2-one and 6,10-dimethyl-5,9-dichloro-6,10-dihydroxydodecan-2-one are similarly prepared by the above process by replacing N-bromosuccinimide with N-chlorosuccinimide (13.3 g.).

The monoene and diene products of the processes of Parts C through L are used as starting materials in the present process.

6,10-Dimethyl-5-fluoro-6-hydroxydodec-9-en-2-one and 6,10-dimethyl-9-fluoro-10-hydroxydodec-5-en-2-one are prepared from the corresponding 5(9), 6(10)-oxido-6,10-dimethyldodec-9(5)-en-2-ones, respectively, by treatment with a carbon tetrachloride solution of hydrogen fluoride (0.1 molar, 1 equivalent) for 1 hour at 0°C. The mixture is evaporated.

EXAMPLE 7

A. A solution of 6,10-dimethyldodeca-5,9-dien-2-one, prepared by the process of Parts A and B of Example 6, (21 g., 0.1 moles) and dry diethyl ether (100 ml.) is added slowly to a suspension of vinyl magnesium bromide (13.1 g., 0.1 moles) in dry diethyl ether. The addition is performed at −20°C. At the completion of the addition, the reaction mixture is allowed to attain room temperature; then the mixture is refluxed for one hour. The mixture is added to an ice cold aqueous ammonia chloride solution; the mixture is extracted with methylene chloride. The extracts are combined, dried over sodium sulfate and evaporated under reduced pressure to yield 3,7,11-trimethyltrideca-1,6,10-trien-3-ol.

Similarly, 3,7,11-trimethyl-11-ethoxytrideca-1,6-dien-3-ol, 3,7,11-trimethyl-6,7-dihydroxytrideca-1,10-dien-3-ol and 3,7,11-trimethyltrideca-1,6-dien-3-ol are prepared by the method of the above process by using 6,10-dimethyl-10-ethoxydodec-5-en-2-one, 6,10-dimethyl-5,6-dihydroxydodec-9-en-2-one and 6,10-dimethyldodec-5-en-2-one as starting materials.

B. By utilizing 3,7,11-trimethyltrideca-1,6,10-trien-3-ol as the starting material in the process of Part E of Example 6, 1-chloro-3,7,11-trimethyltrideca-2,6,10-triene, 1,11-dichloro-3,7,11-trimethyltrideca-2,6-diene, 1,7,11-trichloro-3,7,11-trimethyltridec-2-ene and 1,3,7,11-tetrachloro-3,7,11-trimethyltridecane are obtained. The compounds are separated by gas-liquid chromatography. By utilizing hydrogen fluoride or hydrogen bromide in the process, the corresponding fluorides or bromides are obtained.

3,7,11-Trimethyl-1,2-dichlorotrideca-6,10-dien-3-ol, 3,7,11-trimethyl-6,7,-dichlorotrideca-1,10-dien-3-ol, 3,7,11-trimethyl-10,11-dichlorotrideca-1,6-dien-3-ol, 3,7,11-trimethyl-1,2,6,7-tetrachlorotridec-10-en-3-ol, 3,7,11-trimethyl-1,2,10,11-tetrachlorotridec-6-en-3-ol, 3,7,11-trimethyl-6,7,10,11-tetrachlorotridec-1-en-3-ol and 3,7,11-trimethyl-1,2,6,7,10,11-hexachlorotridecan-3-ol are prepared by utilizing 3,7,11-trimethyltrideca-1,6,10-trien-3-ol as a starting material in the process of Part I of Example 6. By utilizing bromine or fluorine in fluorotrichloromethane, the corresponding bromines or fluorines are obtained.

3,7,11-Trimethyl-1,2-oxidotrideca-6,10-dien-3-ol, 3,7,11-trimethyl-6,7-oxidotrideca-1,10-dien-3-3,7,11-trimethyl-10,11-oxidotrideca-1,6-dien-3-ol, 3,7,11-trimethyl-1,2;6,7-bisoxidotridec-10-en-3-ol, 3,7,11-trimethyl-1,2;10,11-bisoxidotridec-6-en-3-ol, 3,7,11-trimethyl-6,7;10,11-bisoxidotridec-1-en-3-ol and 3,7,11-trimethyl-1,2;6,7;10,11-trisoxidotridecan-3-ol are prepared by utilizing 3,7,11-trimethyltrideca-1,6,10-dien-3-ol as the starting material in the process of Part F of example 6. The oxido groups of these products can be hydrated in the manner prescribed in Part H of example 6.

3,7,11-Trimethyl-1,2-(difluoromethylene)trideca-6,10-dien-3-ol, 3,7,11-trimethyl-6,7-(difluoromethylene)trideca-1,10-dien-3-ol, 3,7,11-trimethyl-10,11-difluoromethylene)trideca-1,6-dien-3-ol, 3,7,11-trimethyl-1,2;6,7-bis(difluoromethylene)-tridec-10-en-3-ol, 3,7,11-trimethyl-1,2;10,11-bis(difluoromethylene)tridec-6-en-3-ol, 3,7,11-trimethyl-6,7;10,11-bis-(difluoromethylene)tridec-1-en-3-ol and 3,7,11-trimethyl-1,2;6,7;10,11-tris(difluoromethylene)tridecan-3-ol are prepared by utilizing 3,7,11-trimethyltrideca-1,6,10-trien-3-ol in the process of Part J of Example 6. Similarly, the corresponding dichloromethylene compounds are prepared by utilizing the process of Part K of Example 6. Likewise, the corresponding methylene compounds are prepared by utilizing the process of Part L of Example 6.

The hydroxy derivatives and the ethers thereof of 3,7,11-trimethyltrideca-1,6,10-triene can also be utilized in the above-mentioned process.

EXAMPLE 8

A. Phosphorus trichloride (13.7 g.) is carefully added to a mixture of 3,7,11-trimethyltrideca-1,6,10-trien-3-ol, prepared in the manner described in Part A of Example 7, (23.7 g.) and pyridine (200 ml.). The addition is carried out at −15°C with stirring. After the completion of the addition, the mixture is stirred for an additional yield 4 hours at −15°C. Ice (100 g.) is added followed by diethyl ether (200 ml.). The resulting mixture is washed with water to neutrality, dried over sodium sulfate and evaporated to dryness to yield 1-chloro-3,7,11-trimethyltrideca12,6,10-triene.

Similarly, 1-chloro-3,7,11-trimethyl-11-ethoxytrideca-2,6-diene is prepared from 3,7,11-trimethyl-11-ethoxytrideca-1,6-dien-3-ol.

B. By repeating the procedures of Parts A and B of Example 6, the procedure of Part A of Example 7 and the procedure of Part A of this example with the exceptions that in Part A of Example 6 2-butanone (methyl ethyl ketone) is optionally replaced with the ketones listed in Column I and the ketone thus obtained in Part A is used in place of 6-methyl-5-octen-2-one in Part B of Example 6, there is obtained the halides listed in Column II.

| I | II |
|---|---|
| ethyl i-propyl ketone | 1-chloro-3,7,12-trimethyl-11-ethyltrideca-2,6,10-triene |
| methyl n-amyl ketone | 1-chloro-3,7,11-trimethylhexadeca-2,6,10-triene |
| ethyl n-butyl ketone | 1-chloro-3,7-dimethyl-11-ethylpentadeca-2,6,10-triene |
| 3-ethyl-2-pentanone | 1-chloro-3,7,11-trimethyl-12-ethyltetradeca-2,6,10-triene |
| diisopropyl ketone | 1-chloro-3,7,12-trimethyl-11-(i-propyl)-trideca-2,6 10-triene |
| methyl n-hexyl ketone | 1-chloro-3,7,11-trimethylheptadeca-2,6,10-triene |
| 5-ethyl-3-heptanone | 1-chloro-3,7-dimethyl-11,13-diethylpentadeca-2,6,10-triene |
| 4-decanone | 1-chloro-3,7-dimethyl-11-(n-propyl)-heptadeca-2,6,10-triene |
| di-n-amyl ketone | 1-chloro-3,7-dimethyl-11-(n-amyl)-hexadeca-2,6,10-triene |
| di-n-hexyl ketone | 1-chloro-3,7-dimethyl-11-(n-hexyl)-heptadeca-2,6,10-triene |
| acetone | 1-chloro-3,7,11-trimethyldodeca-2,6,10-triene |
| methyl n-propyl ketone | 1-chloro-3,7,11-trimethyltetradeca-2,6,10-triene |
| diethyl ketone | 1-chloro-3,7-dimethyl-11-ethyltrideca-2,6,10-triene |
| methyl i-propyl ketone | 1-chloro-3,7,11,12-tetramethyltrideca-2,6,10-triene |
| methyl n-butyl ketone | 1-chloro-3,7,11-trimethylpentadeca-2,6,10-triene |
| ethyl n-propyl ketone | 1-chloro-3,7-dimethyl-11-ethyltetradeca-2,6,10-triene |
| methyl t-butyl ketone | 1chloro-3,7,11,12,12-pentamethyltrideca-2,6,10-triene |
| methyl i-butyl ketone | 1-chloro-3,7,11,13-tetramethyltetradeca-2,6,10-triene |
| methyl s-butyl ketone | 1-chloro-3,7,11,12-tetramethyltetradeca-2,6,10-triene |

C. The procedures of Parts A and B of Example 6, the procedure of Part A of Example 7 and the procedure of Part A of the present example is repeated with the exception that in Part A of Example 6, 1-bromo-4-pentanone is replaced with the 1-bromo-4-ketones listed in Column III to furnish the halides listed in Column IV.

| III | IV |
|---|---|
| 1-bromo-4-hexanone | 1-chloro-3,11-dimethyl-7-ethyltrideca-2,6,10-triene |
| 1-bromo-4heptanone | 1-chloro-3,11-dimethyl-7-(n-propyl)-trideca-2,6,10-triene |
| 1-bromo-4-octanone | 1-chloro-3,11-dimethyl-7-(n-butyl)-trideca-2,6,10-triene |
| 1-bromo-4-nonanone | 1-chloro-3,11-dimethyl-7-(n-amyl)-trideca-2,6,10-triene |
| 1-bromo-5-methyl-4-hexanone | 1-chloro-3,11-dimethyl-7-(i-propyl)-trideca-2,6,10-triene |
| 1-bromo-6-methyl-4-heptanone | 1-chloro-3,11-dimethyl-7-(i-butyl)-trideca-2,6,10-triene |
| 1-bromo-5,5-dimethyl-4-hexanone | 1-chloro-3,11-dimethyl-7-(t-butyl)-trideca-2,6,10-triene |

Similarly, by repeating the procedure of Part B of the present example using the 1-bromo-4-ketones listed in Column III in place of the 1-bromo-4-pentanone employed in Part A of Example 6, there is obtained 1-chloro-3,12-dimethyl-7,11-diethyltrideca-2,6,10-triene, 1-chloro-3,12-dimethyl-7-(n-propyl)-11-ethyltrideca-2,6,10-triene, 1-chloro-3,12-dimethyl-7-(n-butyl)-11-ethyltrideca-2,6,10-triene, 1-chloro-3,12-dimethyl-7-(n-amyl)-11-ethyltrideca-2,6,10-triene, 1-chloro-3,12-dimethyl-7-(i-propyl)-11-ethyltrideca-2,6,10 -triene, 1-chloro-3,12-dimethyl-7-(i-butyl)-11-ethyltrideca-2,6,10-triene, 1-chloro-3,12-dimethyl-7-(t-butyl)-11-ethyltrideca-2,6,10-triene, 1-chloro-3,11-dimethyl-7-ethylhexadeca-2,6,10-triene, 1-chloro-3,11-dimethyl-7-(n-propyl)-hexadeca-2,6,10-triene, 1-chloro-3,11-dimethyl-7-(n-butyl)-hexadeca-2,6,10-triene, and the like.

D. The procedure of Parts A and B of Example 6, the procedures of Part A of Example 7 and the procedure of Part A of this example are repeated with the exception that in Part B of Example 6, 1-bromo-4-pentanone is replaced with the 1-bromo-4-ketones listed in Column III furnishing the following halides: 1-chloro 7,11-dimethyl-3-ethyltrideca-2,6,10-triene, 1-chloro 7,11-dimethyl-3-(n-propyl)-trideca-2,6,10-triene, 1-chloro 7,11-dimethyl-3-(n-butyl)-trideca-2,6,10-triene, 1-chloro 7,11-dimethyl-3-(n-amyl)-trideca-2,6,10-triene, 1-chloro 7,11-dimethyl-3-(i-propyl)-trideca-2,6,10-triene, 1-chloro 7,11-dimethyl-3-(i-butyl)-trideca-2,6,10-triene and 1-chloro 7,11-dimethyl-3-(t-butyl)-trideca-2,6,10-triene.

Similarly, by repeating the procedure at Part B of the present example with the exception that in Part B of Example 6, the 1-bromo-4-ketones listed in Column III are used in place of 1-bromo-4-pentanone, there is obtained:

1-chloro 7,11-dimethyl-3-ethyldodeca-2,6,10-triene,
1-chloro 7,11-dimethyl-3-(n-propyl)-dodeca-2,6,10-triene,
1-chloro 7,11-dimethyl-3-(n-butyl)-dodeca-2,6,10 triene,
1-chloro 7,11-dimethyl-3-(n-amyl)-dodeca-2,6,10-triene,
1-chloro 7,11-dimethyl-3-(i-propyl)-dodeca-2,6,10-triene,
1-chloro 7,11-dimethyl-3-(i-butyl)-dodeca-2,6,10-triene,
1-chloro 7,11-dimethyl-3-(t-butyl)-dodeca-2,6,10-triene,
1-chloro 7,11-dimethyl-3-ethyltetradeca-2,6,10-triene,
1-chloro 3,11-diethyl-7-methyltrideca-2,6,10-triene,
1-chloro 3-ethyl-7,11,12-trimethyltrideca-2,6,10-triene, 1-chloro 7,11-dimethyl-3-ethylpentadeca-2,6,10-triene,
1-chloro 3,11-diethyl-7-methyltetradeca-2,6,10-triene,
1-chloro 3-ethyl-7,11,12,12-tetramethyltrideca-2,6,10-triene,
1-chloro 3-ethyl-7,11,13-trimethyltetradeca-2,6,10-triene,
1-chloro 3-ethyl-7,11,12-trimethyltetradeca-2,6,10-triene,
1-chloro 3,11-diethyl-7,12-dimethyltrideca-2,6,10-triene,
1-chloro 3-ethyl-7,11-dimethylhexadeca-2,6,10-triene,
1-chloro 3,11-diethyl-7-methylpentadeca-2,6,10-triene,
1-chloro 3,11,12-triethyl-7-methyltetradeca-2,6,10-triene,
1-chloro 3-ethyl-7,12-dimethyl-11-(i-propyl)-trideca-2,6,10-triene,
1-chloro 7,11-dimethyl-3-ethylheptadeca-2,6,10-triene,
1-chloro 7-methyl-3,11,13-triethyltetradeca-2,6,10-triene,
1-chloro 3-ethyl-7-methyl-11-(n-propyl)-heptadeca-2,6,10-triene,
1-chloro 3-ethyl-7-methyl-11-(n-amyl)-hexadeca-2,6,10-triene,
1-chloro 3-ethyl-7-methyl-11-(n-hexyl)-heptadec-2,6,10-triene, and the like.

Likewise, by repeating the procedure of Part C of the present example with the exception that in Part B of Example 6, 1-bromo-4-pentanone is replaced with the 1-bromo-4-ketones listed in Column III, there is obtained:

1-chloro 3,7-diethyl-11-methyltrideca-2,6,10-triene,
1-chloro 7-ethyl-11-methyl-3-(n-propyl)-trideca-2,6,10-triene,
1-chloro 7-ethyl-11-methyl-3-(n-butyl)-trideca-2,6,10-triene,
1-chloro 7-ethyl-11-methyl-3-(n-amyl)-trideca-2,6,10-triene,
1-chloro 7-ethyl-3-(i-propyl)-11-methyltrideca-2,6,10-triene,
1-chloro 7-ethyl-3-(i-butyl)-11-methyltrideca-2,6,10-triene,
1-chloro 7-ethyl-11-methyl-3-(t-butyl)-trideca-2,6,10-triene,
1-chloro 3-ethyl-11-methyl-7-(n-propyl)-trideca-2,6,10-triene,
1-chloro 3-ethyl-11-methyl-7-(n-butyl)-trideca-2,6,10-triene,
1-chloro 3-ethyl-11-methyl-7-(n-amyl)-trideca-2,6,10-triene,
1-chloro 3-ethyl-7-(i-propyl)-11-,ethyltrideca-2,6,10-triene,
1-chloro 3-ethyl-7-(i-butyl)-11-methyltrideca-2,6,10-triene,
1-chloro 3-ethyl-11-methyl-7-(t-butyl)-trideca-2,6,10-triene,
1-chloro 3,7-diethyl-11-methyldodeca-2,6,10-triene,
1-chloro 3-ethyl-11-methyl-7-(n-propyl)-dodeca-2,6,10-triene,
1-chloro 3-ethyl-11-methyl-7-(n-butyl)-dodeca-2,6,10-triene,
1-chloro 3-ethyl-11-methyl-7-(n-amyl)-dodeca-2,6,10-triene,
1-chloro 3-ethyl-7-(i-propyl)-11-methyldodeca-2,6,10-triene,
1-chloro 3-ethyl-7-(i-butyl)-11-methyldodeca-2,6,10-triene,
1-chloro 3-ethyl-11-methyl-7-(t-butyl)-dodeca-2,6,10-triene,
1-chloro 3,11-diethyl-11-methyltetradeca-2,6,10-triene,
1-chloro 3-ethyl-11-methyl-7-(n-propyl)-tetradeca-2,6,10-triene,
1-chloro 3-ethyl-11-methyl-7-(n-butyl)-tetradeca-2,6,10-triene, and so forth.

E. The procedure of Parts A and B of Example 6, the procedure of Part A or Example 7 and the procedure of Part A of the present example are repeated with the exception that phosphorus trichloride is replaced with phosphorus tribromide to furnish the corresponding 1-bromo-3,7,11-trimethyltrideca-2,6,10-triene.

Similarly, by repeating the procedures of Parts B, C and D of the present example, with the exception that phosphorus trichloride is replaced with phosphorus tribromine, the corresponding 1-bromo compounds are obtained.

EXAMPLE 9

Twenty-four grams of trans 10-ethoxy-6,10-dimethyl-undec-5-en-2-one in 200 ml. of dry diethyl ether is added dropwise to a solution of vinyl magnesium bromide in 100 ml. of dry tetrahydrofuran. The addition is performed at −20° C. At the completion of the addition, the mixture is allowed to attain a room temperature, and then it is refluxed for 30 minutes. The mixture is poured into a mixture of ammonium chloride, ice and water; this mixture is extracted with diethyl ether. The extracts are combined, washed with water, dried over sodium sulfate and evaporated under reduced pressure to yield trans 11-ethoxy-3,7,11-trimethyldodeca-1,6-dien-3-ol.

In a similar manner, trans 3,7,11-trimethyldodeca-1,6-diene-3,11-diol can be prepared from trans 6,10-dimethyl-10-hydroxydodec-5-en-2-one; 3,7,11-trimethyl-11-propoxydodec-1-en-3-ol can be prepared from 6,10-dimethyl-10-propoxyundecan-2-one; and 3,7,11-trimethyldodeca-1,6,10-trien-3-ol can be prepared from 6,10-dimethylundeca-5,9-dien-2-one.

EXAMPLE 10

Fourteen grams of phosphorous trichloride is slowly added to a solution of trans 3,7,11-trimethyl-3-hydroxy-11-chlorododeca-1,6-diene (25.9 g.) and pyridine (110 ml.). The addition is carried out at a temperature of around −15°C with stirring. At the completion of the addition, the mixture is stirred for an additional four hours at −50°C. Ten grams of shaved ice is slowly added to the mixture while maintaining the temperature below 10°C. Ether (100 ml.) is added and the mixture is washed with water to neutrality. The organic mixture is dried over magnesium sulfate and evaporated to dryness to yield cis,trans and trans,trans 3,7,11-trimethyl-1,11-dichlorododeca-2,6-diene. The geometric isomers are separated by gas-liquid chromatography.

Similarly, by using phosphorous tribromide in place of phosphorus trichloride, cis,trans and trans,trans 1-bromo-3,7,11-trimethyl-11-chlorododeca-2,6-diene is obtained.

EXAMPLE 11

The compounds under Column VI are prepared from the corresponding compounds under Column V by the procedures described in either Examples 8 or 10.

| V | VI |
|---|---|
| cis 3,7,11-trimethyl-3-hydroxydodeca-1,6,10-triene | cis,cis and trans,cis-1-bromo-3,7,11,trimethyldodeca-2,6,10-triene |
| cis 3,7,11-trimethyl-3-hydroxydodeca-1,6,10-triene | cis,cis and trans,cis-1-chloro-3,7,11-trimethyldodeca-2,6,10-triene |
| trans 3,7,11-trimethyl-3-hydroxy-11-ethoxydodeca-1,6-diene | cis,trans and trans,trans-1-chloro-3,7,11-trimethyl-11-ethoxydodeca-2,6-diene |
| 3,7,11-trimethyl-3-hydroxy-11-chlorododec-1-ene | cis and trans-1,11-dichloro-3,7,11-trimethyldodec-2-ene |
| 3,7,11-trimethyl-3-hydroxy-11-acetoxydodec-1-ene | cis and trans-1-chloro-3,7,11-trimethyl-11-acetoxydodec-2-ene |

EXAMPLE 12

To a mixture of 23.6 g. of 3,7,11-trimethyl-3-hydroxytrideca-1,6,10-triene and 100 ml. of pyridine is added 13.7 g. of phosphorus trichloride slowly under dry conditions at −15°C. After the addition is complete, the mixture is stirred for an additional 2 hours at −15°C, and then it is allowed to attain room temperature. Diethyl amine (20 g.) is added to the mixture which contains 1-chloro-3,7,11-trimethyltrideca-2,6,10-triene, and the resulting mixture is allowed to stand for two hours. Methylene chloride (200 ml.) is added to the mixture and the mixture is washed with water to neutrality, dried over sodium sulfate and evaporated to dryness under vacuum to yield N,N-diethyl 3,7,11-trimethyltrideca-2,6,10-trienylamine.

Similarly, N,N-diethyl 3,7,11-trimethyldodeca-2,6,10-trienyl amine, N,N-diethyl 3,11-dimethyl-7ethyl-trideca-2,6,10-trienyl amine and N,N-diethyl 3-methyl-7,11-diethylpentadeca-2,6,10-trienyl amine are prepared from the corresponding 1-chloro compounds which are prepared in the manner described in Example 8.

N-methyl 3,7,11-trimethyltrideca-2,6,10-trienyl amine, N,N-dimethyl 3,7,11-trimethyltrideca-2,6,10-trienyl amine, N-ethyl 3,7,11-trimethyltrideca-2,6,10-trienyl amine, N-propyl 3,7,11-trimethyltrideca-2,6,10-trienyl amine, N,N-dipropyl 3,7,11-trimethyltrideca-2,6,10-trienyl amine, N,N-di($\beta$-hydroxyethyl) 3,7,11-trimethyltrideca-2,6,10-trienyl amine, and N,N-di(methoxymethyl) 3,7,11-trimethyltrideca-2,6,10-trienyl amine are prepared by employing methyl amine, dimethyl amine, ethyl amine, propyl amine, dipropyl amine di($\beta$-hydroxy-ethyl)amine, and di(methoxymethyl)amine, respectively, in place of diethyl amine in the above process.

EXAMPLE 13

Twenty grams of 1-chloro-3,7,11-trimethyltrideca-2,6,10-triene, prepared in the manner described in Example 12, are added to a 150 ml. solution of pyridine cooled to 0°C and saturated with ammonia. The mixture is allowed to stand overnight at 0°C, then the mixture is reduced to dryness under vacuum to yield 3,7,11-trimethyltrideca-2,6,10-trienyl amine.

Similarly, 3,7,11-triethyltrideca-2,6,10-trienyl amine and 3,11-dimethyl-7-ethyltrideca-2,6,10-trienyl amine are prepared from the corresponding 1-chloro compounds which are prepared in the manner described in Example 8.

EXAMPLE 14

Ten grams of pyrrolidine are added to a mixture of 1-chloro-3,7,11-trimethyltrideca-2,6,10-triene (10 g.) and pyridine. The reaction mixture is allowed to stand for 5 hours at −10°C. Methylene chloride (100 ml.) is added; the mixture is washed with 1/10 N aqueous sodium carbonate 3 times, then with water to neutrality and dried over sodium sulfate to yield 1-pyrrolidino-3,7,11-trimethyltrideca-2,6,10-triene.

Likewise, 1-piperidino-3,7,11-trimethyltrideca-2,6,10-triene, 1-morpholino-3,7,11-trimethyltrideca-2,6,10-triene, 1-piperazino-3,7,11-trimethyltrideca-2,6,10-triene, and 1-(4'-ethylpiperazino)-3,7,11-trimethyltrideca-2,6,10-triene are prepared by using piperidine, morpholine, piperazine and 4'-ethylpiperazine in place of pyrrolidine in the above process.

By replacing 1-chloro-3,7,11-trimethyltrideca-2,6,10-triene in the above process with 1-chloro-3,7,11-trimethyldodeca-2,6,10-triene and 1-chloro-3,11-dimethyl-7-ethyltrideca-2,6,10-triene, the following are obtained: 1-pyrrolidino-3,7,11-trimethyldodeca-2,6,10-triene and 1-pyrrolidino-3,11-dimethyl-7-ethyltrideca-2,6,10-triene.

EXAMPLE 15

Phosphorous trichloride (27.4 g., 0.2 moles) is slowly added to a solution of trans 3,7,11-trimethyl-3-hydroxy-11-ethoxydodeca-1,6,-diene (51.2 g., 0.2 moles) and pyridine (100 ml.). The addition is conducted at −15°C under dry conditions. After the addition is complete, the mixture is stirred for an additional 2 hours at −15°C, and then it is allowed to raise to room temperature. Diethyl amine (36 g., 0.5 moles) is added and the mixture is stirred for two hours. Methylene chloride (150 ml.) is added and the mixture is washed with water to neutrality, dried over sodium sulfate and evaporated to dryness to yield cis, trans & trans, trans N,N-diethyl 3,7,11-trimethyl-11-ethoxydodeca-2,6,-dienyl amine. The geometric isomers are separated by gas-liquid chromatography.

By employing methyl amine, dimethyl amine, ethyl amine, di(hydroxymethyl)amine, di($\beta$-hydroxyethyl)amine and di($\beta$-ethoxyethyl)amine in place of diethyl amine, the following are obtained: cis, trans & trans, trans N-methyl 3,7,11-trimethyl-11-ethoxydodeca-2,6-dienyl amine; cis, trans & trans, trans N,N-dimethyl 3,7,11-trimethyl-11-ethoxydodeca-2,6-dienyl amine; cis, trans & trans, trans N-ethyl 3,7,11-trimethyl-11-ethoxydodeca2,6-dienyl amine; cis, trans & trans, trans N,N-di(hydroxymethyl)-3,7,11-trimethyl-11-ethoxydodeca-2,6,-dienyl amine; cis, trans & trans, trans N,N-di($\beta$-hydroxyethyl)3,7,11-trimethyl-11-ethoxydodeca-2,6-dienyl amine; and cis, trans & trans, trans N,N-di($\beta$-ethoxyethyl) 3,7,11-trimethyl-11-ethoxydodeca-2,6-dienyl amine.

EXAMPLE 16

Trans, trans 1-chloro 3,7,11-trimethyl-11-phenethoxydodeca-2,6-diene (32.6 g., 0.1 moles) is added to 100 ml. of benzene, cooled to 10°C and saturated with ammonia. The resulting mixture is stirred for 4 hours allowing the temperature to raise to 25°C while maintaining dry conditions. The mixture is reduced to dryness under reduced pressure to yield trans, trans 3,7,11-trimethyl-11-phenethoxydodeca-2,6-dienyl amine. In a similar manner, trans, trans 3,7,11-trimethyldodeca-11-ethoxy-2,6-dienyl amine is obtained from trans, trans 1-chloro 3,7,11,-trimethyl-11-ethoxydodeca-2,6-diene.

EXAMPLE 17

Cis and trans 1-chloro 3,7,11-trimethyl-11-ethoxydodec-2-ene (27.5 g., 0.1 moles), prepared according to the procedure described in Example 15, is added to a solution of pyridine (50 ml.) and pyrrolidine (14.2 g., 0.2 moles). The mixture is stirred for 3 hours; 100 ml. of diethyl ether is added, and the resulting mixture is washed with water to neutrality. The ether solution is dried over sodium sulfate and evaporated to dryness to yield cis and trans N-pyrrolidino 3,7,11-trimethyl-11-ethoxydodec-2-ene.

Cis and trans N-piperidino 3,7,11-trimethyl-11-ethoxydodec-2-ene; cis and trans N-piperazino 3,7,11-trimethyl-11-ethoxydodec-2-ene; cis and trans N-morpholino 3,7,11-trimethyl-11-ethoxydodec-2-ene; cis and trans N-(4'-ethyl piperazino) 3,7,11-trimethyl-11-ethoxy-dodec-2-ene; or cis and trans N-(4'-ethoxymethyl piperazino) 3,7,11-trimethyl-11-ethoxydodec-2-ene are obtained by utilizing piperidine, piperazine, morpholine, 4'-ethyl piperazine and 4'-ethoxymethyl piperazine respectively, in place of pyrrolidine.

EXAMPLE 18

The compounds in Column VIII can be prepared from the corresponding compounds and ammonia or amines in Column VII by employing the processes described in either Examples 13, 15, 16 or 17.

| VII | VIII |
|---|---|
| trans, trans 1-chloro 3,7,11-trimethyldodeca-2,6,10-triene and diethylamine | trans, trans N,N-diethyl 3,7,11-trimethyldodeca-2,6,10-trienylamine |
| trans, cis 1-chloro 3,7,11-trimethyl-11-propoxydodeca-2,6,-diene and dimethyl amine | trans, cis N,N-dimethyl 3,7,11-trimethyl-11-propoxydodeca-2,6-dienylamine |
| cis, trans 1-chloro 3,7,11-trimethyl-11-(tetrahydrofuran-2'yloxy)dodeca-2,6-diene and ethyl amine | cis, trans N-ethyl 3,7,11-trimethyl-11-(tetrahydrofuran-2'-yloxy)dodeca-2,6-dienylamine |
| trans, trans 1-chloro 3,7,11-trimethyl-11-butoxydodeca-2,6-diene and di(4-hydroxy butyl) amine | trans, trans N,N-di(4'-hydroxybutyl)3,7,11-trimethyl butoxydodeca-2,6-dienylamine |
| trans, cis 1,11-dichloro 3,7,11-trimethyldodeca-2,6,-diene and piperidine | trans, cis N-piperidino 3,7,11-trimethyl-11-chlorododeca-2,6-diene |
| trans, trans 1,11-dichloro 3,7,11-trimethyldodeca-2,6-diene and morpholine | trans, trans N-morpholino 3,7,11-trimethyl-11-chlorododeca-2,6-diene |
| trans, trans 1-chloro 3,7,11-trimethyl-11-hydroxydodeca-2,6-diene and piperidine | trans, trans N-piperidino 3,7,11-trimethyl-11-hydroxydodeca-2,6-diene |
| cis, cis 1-chloro 3,7,11-trimethyl-11-hydroxydodeca-2,6-diene and morpholine | cis, cis N-morpholino 3,7,11-trimethyl-11-hydroxydodeca-2,6-diene |
| trans, cis 1-chloro 3,7,11-trimethyl-11-fluorododeca-2,6-diene and piperazine | trans, cis N-piperizino 3,7,11-trimethyl-11-fluorododeca-2,6-diene |
| trans, cis 1-chloro 3,7,11-trimethyl-11-bromododec-2-ene and pyrrolidine | trans, cis N-pyrrolidino 3,7,11-trimethyl-11-bromododec-2-ene |
| cis, cis 1-chloro 3,7,11-trimethyl-11-caproxydodeca-2,6-diene and di($\beta$-ethoxyethyl)amine | cis, cis N,N-di($\beta$-ethoxyethyl)3,7,11-trimethyl-11-caproxydodeca-2,6-dienylamine |
| trans 1-chloro 3,7,11-trimethyl-11-methoxydodec-2-ene and ammonia | trans 3,7,11-trimethyl-11-methoxydodec-2-enylamine |
| cis 1-chloro 3,7,11-trimethyl-11-formyloxydodec-2-ene and piperidine | cis N-piperidino 3,7,11-trimethyl-11-formyloxydodec-2-ene |

EXAMPLE 19

A. A mixture of 29.1 g. of N,N-diethyl 3,7,11-trimethyltrideca-2,6,10-trienyl amine and 200 ml. of chloroform is cooled to 0°C and saturated with chlorine gas. The mixture is allowed to stand for 1 hour at 0°C, and then it is allowed to attain room temperature. The mixture is washed with water to neutrality, dried over sodium sulfate and reduced to dryness under vacuum to yield a mixture of N,N-diethyl 3,7,11-trimethyl-5,6-dichlorotrideca-2,10-dienyl amine, N,N-diethyl-3,7,11-trimethyl-10,11-dichlorotrideca-2,6-dienyl amine, N,N-diethyl-3,7,11-trimethyl-2,3-dichlorotrideca-6,10-dienyl amine, N,N-diethyl 3,7,11-trimethyl-6,7,10,11-tetrachlorotridec-2-enyl amine, N,N-diethyl 3,7,11-trimethyl-2,3,6,7-tetrachlorotridec-10-enyl amine, N,N-diethyl-3,7,11-trimethyl-2,3,10,11-tetrachlorotridec-6-enylamine and N,N-diethyl 3,7,11-trimethyl-2,3,6,7,10,11-hexachlorotridec ylamine.

The compounds are separated by gas-liquid chromatography.

Similarly, N,N-diethyl 3,7,11-trimethyl-2,3,6,7,10,11-hexachlorotridecyl amine is almost exclusively obtained by utilizing 14.2 g. of chlorine gas in the above process.

By the method of the above process, the 2,3-dichloro, the 6,7-dichloro, the 10,11-dichloro, the 2,3,6,7-tetrachloro, the 2,3,10,11-tetrachloro, the 6,7,10,11-tetrachloro and the 2,3,6,7,10,11-hexachloro isomers of the following compounds are prepared:

N,N-dimethyl 3,7,11-trimethyldodeca-2,6,10-trienyl amine, 1-morpholine 3,7,11-tetradeca-2,6,10-triene, N,N-diethyl 3,11-dimethyl-7-ethyltrideca-2,6,10-trienyl amine, N,N-diethyl 3,7,11-trimethyltetradeca-2,6,10-trienyl amine and N,N-diphenyl 3,11,12-trimethyl-7-ethyltrideca-2,6,10-trienyl amine.

B. By utilizing bromine or fluorine in place of chlorine in the process of Part A, the corresponding 2,3-dibromo, 6,7-dibromo, 10,11-dibromo, 2,3,6,7-tetrabromo, 2,3,10,11-tetrabromo, 6,7,10,11-tetrabromo, 2,3,6,7,10,11-hexabromo, 2,3-difluoro, 6,7-difluoro, 10,11-difluoro, 2,3,6,7-tetrafluoro, 2,3,10,11-tetrafluoro, 6,7,10,11-tetrafluoro, 2,3,6,7,10,11-hexafluoro compounds are prepared (commensing at −80°C).

The monoene and diene products of Examples 7 through 18 are used as starting materials for the present process.

EXAMPLE 20

A. A mixture of 29.1 g. of N,N-diethyl 3,7,11-trimethyltrideca-2,6,10-trienyl amine, 200 ml. of dry diethyl ether and 3.7 g. of hydrogen chloride at 0°C is allowed to stand for 10 hours. The mixture is carefully neutralized with the addition of aqueous 1 percent sodium bicarbonate, then washed with water to neutrality, dried over sodium sulfate and evaporated to dryness to yield a mixture of N,N-diethyl 3,7,11-trimethyl-3-chlorotrideca-6,10-dienyl amine, N,N-diethyl 3,7,11-trimethyl-7-chlorotrideca-2,10-dienyl amine, N,N-diethyl 3,7,11-trimethyl-11-chlorotrideca-2,6-dienyl amine. The compounds are isolated by gas-liquid chromatography.

By utilizing 7.3 g of hydrogen choride in the above process, N,N-diethyl 3,7,11-trimethyl-3,7-dichlorotridec-10-enyl amine, N,N-diethyl 3,7,11-trimethyl-3,11-dichlorotridec-6-enyl amine and N,N-diethyl 3,7,11-trimethyl-7,11-dichlorotridec-2-enyl amine are obtained. The three compounds are separated by gas-liquid chromatography.

By utilizing 11.0 g. of hydrogen chloride in the above process, and allowing the reaction to proceed for 5 hours, N,N-diethyl 3,7,11-trimethyl-3,7,11-trichlorotridecyl amine is obtained.

By the above method, the 3-chloro, 7-chloro, 11-chloro, 3,7-dichloro, 3,11-dichloro, 7,11-dichloro and 3,7,11-trichloro isomers (the 7,11-positions being favored) of N,N-diethyl 3,7,11-trimethyldodeca-2,6,10-trienyl amine, N,N-diethyl 3,11-dimethyl-7-ethyltrideca-2,6,10-trienyl amine and 3-methyl-7,11-diethylheptadeca-2,6,10-trienyl amine are prepared.

Similarly, the corresponding 3-bromo, 7-bromo, 11-bromo, 3,7-dibromo, 3,11-dibromo, 7,11-dibromo and 3,7,11-tribromo or 3-fluoro, 7-fluoro, 11-fluoro, 3,7-difluoro, 3,11-difluoro, 7,11-difluoro and 3,7,11-trifluoro compounds are prepared by utilizing hydrogen bromide or hydrogen fluoride in the appropriate amounts in the above process.

The monoene, diene and triene products of Examples 7 through 19 are used as starting materials in the above process to obtain the corresponding 3,7, or 11-halo compound or 3,7; 3,11 or 7,11-dihalo compound.

EXAMPLE 21

A mixture of 29.1 g. of N,N-diethyl 3,7,11-trimethyltrideca-2,6,10-trienyl amine and 300 ml. of chloroform is saturated with dry hydrogen chloride at 0°C. The mixture is allowed to stand for 6 hours. The mixture is then neutralized by the careful addition of an aqueous 1 percent solution of sodium bicarbonate. The mixture is then washed with water to remove all inorganic ions, dried over magnesium sulfate and evaporated to dryness under vacuum to yield N,N-diethyl 11-chloro-3,7,11-trimethyltrideca-2,6-dienyl amine.

Similarly, N,N-diethyl 3,7,11-trimethyl-11-fluorotrideca-2,6-dienyl amine and N,N-diethyl 3,7,11-trimethyl-11-bromotrideca-2,6-dienyl amine are obtained by replacing dry hydrogen chloride with dry hydrogen fluoride or dry hydrogen bromide, respectively, in the above procedure.

By the above process, N,N-diethyl 3,7,11-trimethyl-11-chlorododeca-2,6-dienyl amine, N,N-diethyl 3,11-dimethyl-7-ethyl-11-chlorotrideca-2,6-dienyl amine and N,N-diethyl 3,7,11-trimethyl-3,7,11-trichloropentadec-2-enyl amine are prepared from the corresponding 11-ene compounds which are prepared by the procedures described in Examples 12, 13 and 18.

The monoene, diene and triene products of Examples 7 through 20 are appropriate starting materials for the present examples.

EXAMPLE 22

A. 29 Grams of N,N-diethyl 3,7,11-trimethyltrideca-2,6,10-trienyl amine is added to a mixture of 300 ml. of 98 percent formic acid, 200 ml. of water and 1.5 g. of sodium formate. The mixture is stirred for 4 days while maintaining the temperature at 30°C; the mixture is then neutralized with aqueous 1 percent sodium carbonate and then extracted with ethyl acetate (4x). The ethyl acetate extracts are combined, washed with water, dried over sodium sulfate and evaporated under vacuum to yield a mixture of N,N-diethyl 3,7,11-trimethyl-7-hydroxytrideca-2,10-dienyl amine, N,N-diethyl 3,7,11-trimethyl-11-hydroxytrideca-2,6-dienyl amine and N,N-diethyl 3,7,11-trimethyl-7,11-dihydroxytridec-2-enyl amine. The three compounds are separated by gas-liquid chromatography.

B. Similarly, the 7-hydroxy, 11-hydroxy and 7,11-dihydroxy isomers of N,N-diethyl 3,7,11-trimethyldodeca-2,6,10-trienyl amine, N,N-diethyl 3,11-dimethyl-7-ethyltrideca-2,6,10-trienyl amine and N,N-diethyl 3-methyl-7,11-diethyltrideca-2,6,10-trienyl amine are prepared by the above procedure by utilizing the latter compounds as starting materials.

The monoene, diene and triene products of Examples 7 through 21 are appropriate starting materials for the present example.

EXAMPLE 23

One gram of N,N-diethyl 3,7,11-trimethyl-11-hydroxytrideca-2,6-dienyl amine in 10 ml. of diglyme is added in a dropwise fashion over a 20-minute period to a slurry of 1 g. of sodium hydride in 10 ml. of diglyme under a nitrogen atmosphere. There is next added in a dropwise fashion over a 10-minute period 0.9 g. of 2-chlorotetrahydropyran. This mixture is stirred at about 25°C for 30 minutes and then quenched in ice water. The organic phase is separated and extracted with ether. These extracts are washed with water, dried over sodium sulfate and evaporated to yield N,N-diethyl 3,7,11-trimethyl-11-(tetrahydropyran-2'-yloxy)trideca-2,6-dienyl amine.

By employing 2-chlorotetrahydrofuran in the foregoing procedure, the corresponding tetrahydrofuranyl ether is obtained.

EXAMPLE 24

One gram of N,N-diethyl 3,7,11-trimethyl-11-hydroxytrideca-2,6-dienyl amine in 8 ml. of pyridine and 2 ml. of triethyl amine is treated with 1 ml. of acetyl chloride. This mixture is allowed to stand for 15 hours at about 25°C and is then poured into ice water and extracted with methylene chloride. These extracts are washed well with water, dried over sodium sulfate and evaporated to yield N,N-diethyl 3,7,11-trimethyl-11-acetoxytrideca-2,6-dienyl amine.

Use of other acid chlorides, such as trimethylacetyl chloride, benzoyl chloride, phenylacetyl chloride, and the like, yields the corresponding esters.

EXAMPLE 25

A solution of 2.5 g. of N,N-diethyl 3,7,11-trimethyl-trideca-2,6,10-trienyl amine in 100 ml. of chloroform is cooled to 0°C and mixed with a solution of 1.1 molar equivalents of m-chloroperbenzoic acid in ether. The mixture is allowed to stand at room temperature for 20 hours and then diluted with water. The organic layer is separated, washed with aqueous sodium bicarbonate solution and then with water to neutrality, dried over sodium sulfate and evaporated to dryness to yield a mixture of N,N-diethyl 3,7,11-trimethyl-2,3-oxidotrideca-6,10-dienyl amine, N,N-diethyl 3,7,11-trimethyl-6,7-oxidotrideca-2,10-dienyl amine, N,N-diethyl 3,7,11-trimethyl-10,11-oxidotrideca-2,6-dienyl amine. Similarly, by utilizing 2.1 molar equivalents of m-chloroperbenzoic acid, the following are obtained: N,N-diethyl 3,7,11-trimethyl-2,3;6,7-bisoxidotridec-10-enyl amine, N,N-diethyl 3,7,11-trimethyl-2,3;10,11-bisoxidotridec-6-enyl amine, N,N-diethyl 3,7,11-trimethyl-6,7;10,11-bisoxidotridec-2-enyl amine. By utilizing 3.1 molar equivalents of m-chloroperbenzoic acid, N,N-diethyl 3,7,11-trimethyl-2,3;6,7,10,11-trisoxidotridecyl amine is obtained. The above compounds are isolated by gas-liquid chromatography.

By the same process, the 2,3-oxido, 6,7-oxido, 10,11-oxido, 2,3;6,7-bisoxido, 2,3;10,11-bisoxido, 6,7;10,11-bisoxido and 2,3;6,7;10,11-trisoxido adducts of N,N-diethyl 3,7,11-trimethyldodeca-2,6,10-trienyl amine, N,N-diethyl 3,11-dimethyl-7-ethyltrideca-2,6,10-trienyl amine and N,N-dimethyl 3,11-dimethyl-7-ethyl-trideca-2,6,10-trienyl amine are prepared by using the latter compounds as starting materials.

The monoene, diene and triene products of Examples 12, 13, 14, 22, 23, and 24, that are not substituted by a halo group, are used as starting materials for the present example.

EXAMPLE 26

To a solution of 10 g. of N,N-diethyl-2,3-oxido-3,7,11-trimethyltrideca-6,10-dienyl amine in 150 ml. of ether is added one molar equivalent of lithium aluminum hydride. The resultant solution is allowed to stand at 0°C for 30 minutes after which time 5 ml. of ethyl acetate is cautiously added followed by 2 ml. of water. Sodium sulfate is added next, the mixture is filtered, and the filtrate evaporated to yield N,N-diethyl 3,7,11-trimethyl-3-hydroxytrideca-6,10-dienyl amine.

In like manner, N,N-diethyl 3,7,11-trimethyl-3-hydroxydodeca-6,10-dienyl amine, N,N-diethyl 3,11-dimethyl-7-ethyl-3-hydroxytrideca-6,10-dienyl amine, N,N-dimethyl 3,7,11-tributyl-3-hydroxypentadeca-6,10-dienyl amine, N,N-diethyl 3,7,11-triethyl-3-hydroxytrideca-6,10-dienyl amine, N,N-diethyl 3,7,11-tributyl-3-hydroxypentadeca-6,10-dienyl amine and N,N-diethyl 3,11-dimethyl-7-ethyl-3-hydroxytetradeca-6,10-dienyl amine are prepared from the corresponding 2,3-oxido compounds.

The products of Example 25 are appropriate starting materials for the present process.

The hydroxy derivatives of the present process are esterified and etherified by the process described in Examples 2, 23 and 24.

EXAMPLE 27

Ten g. of N,N-diethyl 10,11-oxido-3,7,11-trimethyl-trideca-2,6-dienyl amine are added to 100 ml. of a 0.01 N. aqueous perchloric acid solution and the resultant solution is allowed to stand at room temperature for 24 hours. Thereafter the mixture is washed with an aqueous sodium bicarbonate solution, dried over sodium sulfate, and evaporated giving N,N-diethyl 10,11-dihydroxy-3,7,11-trimethyltrideca 2,6-dienyl amine.

By repeating the above procedure utilizing in lieu of the aqueous perchloric acid solution, a 0.01 N. solution of perchloric acid in (lower) alkanol solvent, the corresponding 10-hydroxy-11-(lower)alkoxy derivative is prepared, that is, N,N-diethyl-10-hydroxy-11-ethoxy-3,7,11-trimethyltrideca-2,6-dienyl amine when ethanol is used as solvent. Similarly, the use of methanol, propanol, etc., affords the corresponding 3-methoxy, 3-propoxy and the like, compounds.

Similarly N,N-diethyl 3,7,11-trimethyl-10-hydroxy-11-ethoxydodeca-2,6-dienyl amine, N,N-diethyl 3,7,11-dimethyl-7-ethyl-10-hydroxy-11-ethoxytrideca-2,6-dienyl amine and N-morpholino 3,11-dimethyl-7-ethyl-10-hydroxy-11-ethoxytrideca-2,6-diene are prepared from the corresponding 10,11-oxido compounds.

By the above process, 2,3-dihydroxy, 2-hydroxy-3-(lower)alkoxy, 6,7-dihydroxy, 6-hydroxy-7-(lower)alkoxy, 2,3,6,7-tetrahydroxy, 2,6-dihydroxy-3,7-di(lower)alkoxy, 2,3,10,11-tetrahydroxy, 2,10-dihydroxy-3,11-di(lower)alkoxy, 6,7,10,11-tetrahydroxy, 6,10-dihydroxy-7,11-di(lower)alkoxy, 2,3,6,7,10,11-hexahydroxy and 2,6,10-trihydroxy-3,7,11-tri(lower)alkoxy com-pounds are prepared from the corresponding 2,3-oxido, 6,7-oxido, 2,3;6,7-bisoxido, 2,3;10,11-bisoxido, 6,7;10,11-bisoxido and 2,3;6,7;10,11-trisoxido compounds.

EXAMPLE 28

To a solution of 10 g. of N,N-diethyl 3,7,11-trimethyl-trideca-2,6,10-trienyl amine in 50 ml. of benzene is added 1.0 molar equivalents of trimethyltrifluoromethyl tin reagent and 1.2 molar equivalents of sodium iodide in 10 ml. of monoglyme. The reaction mixture is refluxed for 2 hours after which time it is cooled, washed with water, and evaporated to give N,N-diethyl 3,7,11-trimethyl-2,3-difluoromethylenetrideca-6,10-dienyl amine, N,N-diethyl 3,7,11-trimethyl-6,7-difluoromethylenetrideca-2,10-dienyl amine and N,N-diethyl 3,7,11-trimethyl-10,11-difluoromethylenetrideca-2,6-dienyl amine. The compounds are separated by gas-liquid chromatography. Upon repeating the above reaction with 2.5 molar equivalents of the trimethyltrifluoromethyl tin reagent and sodium iodide reagents, N,N-diethyl 3,7,11-trimethyl-2,3;6,7-bis(difluoromethylene)tridec-10-enyl amine, N,N-diethyl 3,7,11-trimethyl-6,7;10,11-bis(difluoromethylene)tridec-2-enyl amine and N,N-diethyl 3,7,11-trimethyl2,3;10,11-bis(difluoromethylene)tridec-6-enyl amine are obtained The compounds are separated by gas-liquid chromatography.

Upon repeating the above reaction with 5.0 molar equivalents of the trimethyltrifluoromethyl tin reagent and sodium iodide, N,N-diethyl 3,7,11-trimethyl-2,3;6,7;10,11-tris-(difluoromethylene)tridecyl amine is obtained.

In a like manner, the mono(difluoromethylene), bis-(difluoromethylene) and tris(difluoromethylene) derivatives of the following starting materials are obtained: N,N-diethyl 3,7,11-trimethyldodeca-2,6,10-trienyl amine, N,N-diethyl 3,11-dimethyl-7-ethyl-trideca-2,6,10-trienyl amine and N,N-diethyl 3,7-dimethyl-11-ethyltrideca-2,6,10-trienyl amine.

The monoene and diene products of the present example are appropriate starting materials for the processes of Examples 19 through 28. The monoene and diene products of the processes of Examples 12-14 and 22-28 are appropriate starting materials for the present example.

EXAMPLE 29

To a solution of 10 g. of N,N-diethyl 3,7,11-trimethyl-trideca-2,6,10-trienyl amine and 100 ml. of benzene, 1.2 molar equivalents of phenyl dichlorobromomethyl mercury reagent is added. The mixture is refluxed for 3.5 hours, then cooled to 30°C. The mixture is chromatographed on a silic acid column and evaporated to dryness to yield a mixture of N,N-diethyl 3,7,11-trimethyl-2,3-dichloromethylenetrideca-6,10-dienyl amine, N,N-diethyl 3,7,11-trimethyl-6,7-dichloromethylenetrideca-2,10-dienyl amine and N,N-diethyl 3,7,11-trimethyl-10,11-dichloro-methylenetrideca-2,6-dienyl amine.

The compounds are separated by gas-liquid chromatography.

Upon repeating the above procedure with 2.5 molar equivalents of phenyl dichlorobromomethyl mercury reagent, the following compounds are obtained: N,N-diethyl 3,7,11-trimethyl-2,3;6,7-bis(dichloromethylene)tridec-10-enyl amine, N,N-diethyl 3,7,11-trimethyl-2,3;10,11-bis(dichloromethylene)tridec-6-enyl amine and N,N-diethyl 3,7,11-trimethyl-6,7;10,11-bis(dichloromethylene)tridec-2-enyl amine.

The compounds are separated by gas-liquid chromatography.

Upon repeating the above procedure with 5.0 molar equivalents of the phenyl(dichlorobromomethyl)mercury reagent, N,N-diethyl 3,7,11-trimethyl-2,3;6,7;10,11-tris(dichloromethylene) tridecyl amine is obtained.

EXAMPLE 30

One gram of N,N-diethyl 3,7,11-trimethyltrideca-2,6,10-trienylamine in 50 ml. of benzene is hydrogenated with one molar equivalent of hydrogen using 0.3 g. of 5 percent palladium-on-charcoal catalyst at atmospheric pressure and room temperature. The catalyst is then removed by filtration and the filtrate evaporated to yield a mixture of N,N-diethyl 3,7,11-trimethyltrideca-2,6-dienyl amine and N,N-diethyl 3,7,11-trimethyltrideca-2,10-dienyl amine. The compounds are separated by gas-liquid chromatography.

Upon repeating the above procedure with the exception that the hydrogenation is accomplished with two molar equivalents of hydrogen, N,N-diethyl 3,7,11-trimethyltridec-2-enyl amine is obtained.

Similarly, the 2,6-diene, 2,10-diene and 2-ene derivatives of the following compounds are prepared: N,N-diethyl 3,7,11-trimethyldodeca-2,6,10-trienyl amine, N,N-diethyl 3,11-dimethyl-7-ethyltrideca-2,6,10-trienyl amine and N,N-dimethyl 3,11-diethyl-7-propyltetradeca-2,6,10-trienyl amine. By the above procedure, the monoene, diene and triene products of Examples 7 through 30 are hydrogenated.

What is claimed is:

1. A compound selected from those of the formula:

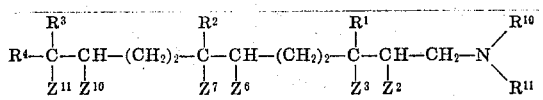

wherein,
each of $R^1$, $R^2$, $R^3$ and $R^4$ is lower alkyl;
each of $R^{10}$ and $R^{11}$ is hydrogen, lower alkyl, lower hydroxyalkyl, or lower alkoxyalkyl;
$Z^2$ and $Z^3$, when taken separately, each represent hydrogen, and when taken together, for a carbon-carbon double bond between C-2,3 or the group

$Z^6$ and $Z^7$, when taken separately, each represent hydrogen, and when taken together, form a carbon-carbon double bond between C-6,7 or the group

$Z^{10}$ and $Z^{11}$, when taken separately, each represent hydrogen, and when taken together, form a carbon-carbon double bond between C-10,11 or the group

and
X is bromo or chloro, provided that at least one of $Z^2$ and $Z^3$, $Z^6$ and $Z^7$, or $Z^{10}$ and $Z^{11}$ is the group

2. A compound according to claim 1 wherein $Z^2$ and $Z^3$ form a carbon-carbon double bond between C-2,3; $Z^6$ and $Z^7$, when taken separately, represent hydrogen or when taken together, form a carbon-carbon double bond between C-6,7; and each of $R^1$, $R^2$, $R^3$ and $R^4$ is methyl or ethyl.

3. A compound according to claim 1 wherein $Z^6$ and $Z^7$, when taken separately, represent hydrogen and when taken together, form a carbon-carbon double bond between C-6,7; $Z^{10}$ and $Z^{11}$, when taken separately, represent hydrogen and when taken together, form a carbon-carbon double bond between C-10,11; and each of $R^1$, $R^2$, $R^3$ and $R^4$ is methyl or ethyl.

4. A compound according to claim 1 wherein $Z^{10}$ and $Z^{11}$ taken together, form the group

in which X is fluoro; $Z^2$ and $Z^3$ taken together, form a carbon-carbon double bond; $Z^6$ and $Z^7$ taken together, form a carbon-carbon double bond; and each of $R^{10}$ and $R^{11}$ is methyl or ethyl.

5. A compound according to claim 4 wherein each of $R^{10}$ and $R^{11}$ is ethyl; $R^1$ is methyl; and each of $R^2$, $R^3$ and $R^4$ is methyl or ethyl.

6. A compound according to claim 1 wherein $Z^{10}$ and $Z^{11}$ taken together, form the group

in which X is chloro; $Z^2$ and $Z^3$ taken together, form a carbon-carbon double bond; $Z^6$ and $Z^7$ taken together, form a carbon-carbon double bond; each of $R^{10}$ and $R^{11}$ is methyl or ethyl.

7. A compound according to claim 6 wherein each of $R^1$, $R^2$, $R^3$ and $R^4$ is methyl or ethyl.

8. A compound according to claim 6 wherein each of $R^1$, $R^2$, $R^3$ and $R^4$ is methyl and each of $R^{10}$ and $R^{11}$ is ethyl.

9. A compound according to claim 1 wherein $Z^2$ and $Z^3$ form the group

$Z^6$ and $Z^7$ form a carbon-carbon double bond; each of $R^1$, $R^2$, $R^3$ and $R^4$ is methyl or ethyl; and each of $R^{10}$ and $R^{11}$ is methyl or ethyl.

* * * * *